US012217953B2

(12) United States Patent
Hasegawa et al.

(10) Patent No.: US 12,217,953 B2
(45) Date of Patent: Feb. 4, 2025

(54) ION SOURCE AND MASS SPECTROMETER

(71) Applicant: Hitachi High-Tech Corporation, Tokyo (JP)

(72) Inventors: Hideki Hasegawa, Tokyo (JP); Masuyuki Sugiyama, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 318 days.

(21) Appl. No.: 17/781,449

(22) PCT Filed: Oct. 15, 2020

(86) PCT No.: PCT/JP2020/038983
§ 371 (c)(1),
(2) Date: Jun. 1, 2022

(87) PCT Pub. No.: WO2021/124666
PCT Pub. Date: Jun. 24, 2021

(65) Prior Publication Data
US 2023/0005730 A1 Jan. 5, 2023

(30) Foreign Application Priority Data
Dec. 19, 2019 (JP) .................... 2019-229656

(51) Int. Cl.
*H01J 49/00* (2006.01)
*G01N 27/623* (2021.01)
(Continued)

(52) U.S. Cl.
CPC .......... *H01J 49/167* (2013.01); *G01N 27/623* (2021.01); *H01J 49/0445* (2013.01)

(58) Field of Classification Search
CPC .. H01J 49/167; H01J 49/0445; H01J 49/0404; G01N 27/623
(Continued)

(56) References Cited

U.S. PATENT DOCUMENTS 7,424,980 B2 * 9/2008 Ruediger .............. H01J 49/167
239/338
7,872,224 B2 * 1/2011 Finch .................. G01N 30/7246
250/281
(Continued)

FOREIGN PATENT DOCUMENTS

JP 2004-095451 A 3/2004
JP 2006-153603 A 6/2006
(Continued)

OTHER PUBLICATIONS

"Waters Micromass Quattro Premier Mass Spectrometer Operator's Guide" 7.12.2 "Removing the Existing Capillary" and 7.12.3 "Installing the New Capillary", [online], the Internet <URL:https://www.waters.com/waters/supportList.htm?cid=511442&locale=ja_JP>, 10 pgs.
Extended European Search Report issued on Dec. 1, 2023 for European Patent Application No. 20901312.7.

*Primary Examiner* — Michael Maskell
(74) *Attorney, Agent, or Firm* — Volpe Koenig

(57) ABSTRACT

Provided are an ion source and a mass spectrometer that reduce a dead volume of the connecting part of a pipe to a capillary. An ion source has a capillary and a pipe. The capillary has a large-diameter part that forms a capillary upstream-side end face on an upstream side. The large-diameter part has a large-diameter part downstream side face on a downstream side. The pipe has a pipe downstream end face on the downstream side. A capillary retaining unit has a hole through which the capillary downstream-side end face is passable and a face on which the large-diameter part downstream side face is installable. The ion source includes
(Continued)

a pipe retaining unit that retains the pipe. The capillary retaining unit and the pipe retaining unit are disposed such that the capillary upstream-side end face contacts the pipe downstream end face to connect the capillary to the pipe.

11 Claims, 23 Drawing Sheets

(51) Int. Cl.
*H01J 49/04* (2006.01)
*H01J 49/16* (2006.01)

(58) Field of Classification Search
USPC .................................. 250/281, 282, 288
See application file for complete search history.

(56) References Cited

U.S. PATENT DOCUMENTS

| | | | |
|---|---|---|---|
| 2005/0258361 A1* | 11/2005 | Whitehouse | H01J 49/167 250/288 |
| 2019/0259597 A1* | 8/2019 | Gebhardt | H01J 49/167 |

FOREIGN PATENT DOCUMENTS

| | | | |
|---|---|---|---|
| JP | 2008-021455 A | 1/2008 | |
| JP | 2015-201449 A | 11/2015 | |
| WO | 2019/049271 A1 | 3/2019 | |

\* cited by examiner

ION SOURCE AND MASS SPECTROMETER

TECHNICAL FIELD

The present invention relates to an ion source and a mass spectrometer, and particularly to ones that are capable of achieving high maintainability. Moreover, a part of the present invention also relates to an ion source and a mass spectrometer that are capable of high analysis stability and high analysis reproducibility.

BACKGROUND ART

Electrospray ionization, which is a typical ionization method used for mass spectrometry and the like (in the following, referred to as an "ESI method"), is a method in which a sample liquid solution is introduced from the upstream end of a capillary and ions or droplets are sprayed from the downstream end using an electric field and the like.

A typical configuration of a conventional mass spectrometer is shown in FIG. 1. Mainly, a mass spectrometer 101 includes an ion source 102 and a vacuum chamber 104 having a mass spectrometry unit 103 in its inside. The ion source 102 mainly includes an ion producing unit 105 and an ion source chamber 106.

Ions produced at the ion source 102 are introduced from a hole 108 of an introduction electrode 107 into the inside of the vacuum chamber 104, and analyzed at the mass spectrometry unit 103. To the mass spectrometry unit 103, various voltages are applied with a power supply 109. The voltage values and the timing of voltage application with the power supply 109 are controlled by the control unit 110.

As the typical detailed structure of the ion producing unit 105, a sample liquid solution is introduced into a capillary 112 through a pipe 111, and ions or droplets are sprayed from a downstream end 113 of the capillary 112 using an electric field, and the like.

In the ion source as described above, it is important to connect the pipe 111 to the capillary 112 such that no sample liquid solution leaks.

As a publicly known example that describes a method of connecting the pipe 111 to the capillary 112, there is Non-Patent Literature 1. As shown in FIG. 2, in this publicly known example, the pipe 111 is connected to the capillary 112 through a union 114.

The liquid solution in the inside of the pipe 111 and the union 114 is sealed with a tapered part 116 of a connector 115. Specifically, the connector 115 is turned and advanced with a screw part 117 to cause the tapered part 116 to enter a tapered part 118 in the inside of the union, the diameter of the tapered part 116 is decreased, the tapered part 116 engages with the outer diameter of the pipe 111, and thus the union 114 and the pipe 111 are sealed.

The capillary 112 and the union 114 seal the liquid solution with a tapered part 120 of a ferrule 119. Specifically, a set screw 122 is turned and advanced with a screw part 121 to cause the tapered part 120 to enter a tapered part 123 in the inside of the union, the diameter of the tapered part 120 is decreased, the tapered part 120 engages with the outer diameter of a resin tube 124, and thus the union 114 and the capillary 112 are sealed through the resin tube 124. The reason why the resin tube 124 is interposed is that the outer diameter of the capillary 112 is a small diameter.

Citation List

Non-Patent Literature

Non-Patent Literature 1: "Waters Micromass Quattro Premier Mass Spectrometer Operator's Guide" 7.12.2 "Removing the Existing Capillary" and 7.12.3 "Installing the New Capillary", [online], the Internet <URL:https://www.waters.com/waters/supportList.htm?cid=511442&local e=ja_JP>

SUMMARY OF INVENTION

Technical Problem

However, in the conventional technique, there is a problem that the dead volume at the connecting portion of the pipe to the capillary is large.

For example, in the sealing method with the tapered parts as shown in FIG. 2, since a micro gap is produced on the downstream side from a sealing site at which the tapered part 116 contacts the tapered part 118 on the pipe 111 side and a micro gap is produced on the upstream side from a sealing site at which the tapered part 120 contacts the tapered part 123 on the capillary 112 side, the dead volume increases.

Moreover, in the sealing method through the resin tube 124, since a gap is present between the resin tube 124 and the capillary 112 on the upstream side from the sealing site, the dead volume increases.

Since it takes time to replace the sample liquid solution when a dead volume is present, it is likely to cause the degradation in analysis performance due to carry-over and the like. Moreover, contamination is accumulated at a dead volume at which the replacement of the liquid solution is difficult, and this might lead to the possibility of shortening part lifetime due to clogging and the like caused by the contamination as well.

The present invention has been made for solving such problems, and an object is to provide an ion source and a mass spectrometer that further decrease a dead volume at the connecting portion of a pipe to a capillary.

Solution to Problem

An example of an ion source according to the present invention includes: a capillary into which a sample liquid solution is introduced, the capillary being configured to supply an ion or a droplet; and a pipe configured to supply a sample liquid solution to the capillary. In the ion source, the capillary has a capillary upstream-side end face on an upstream side, and has a capillary downstream-side end face on a downstream side, and an outer diameter of the capillary upstream-side end face is greater than an outer diameter of the capillary downstream-side end face. The capillary has a large-diameter part that forms the capillary upstream-side end face on the upstream side, and the large-diameter part has a large-diameter part downstream side face on the downstream side. The pipe has a pipe downstream end face on the downstream side. The ion source includes a capillary retaining unit configured to retain the capillary. The capillary retaining unit has a hole through which the capillary downstream-side end face is passable and has a face on which the large-diameter part downstream side face is installable. The ion source includes a pipe retaining unit configured to retain the pipe. The capillary retaining unit and the pipe retaining unit are disposed such that the capillary upstream-side end face contacts the pipe downstream end face to connect the capillary to the pipe.

Moreover, an example of a mass spectrometer according to the present invention includes the above-described ion source.

The present specification incorporates the content of the disclosure of Japanese Patent Application No. 2019-229656 upon which priority is claimed.

Advantageous Effects of Invention

The ion source and the mass spectrometer according to the present invention are capable of further decreasing a dead volume at the connecting portion of the pipe to the capillary.

DESCRIPTION OF EMBODIMENTS

In the following, embodiments of the present invention will be described with reference to the accompanying drawings.

First Embodiment

A first embodiment is an ion source and a mass spectrometer in a configuration in which a pipe is directly face-sealed to a capillary with elastic force.

Figure 3:
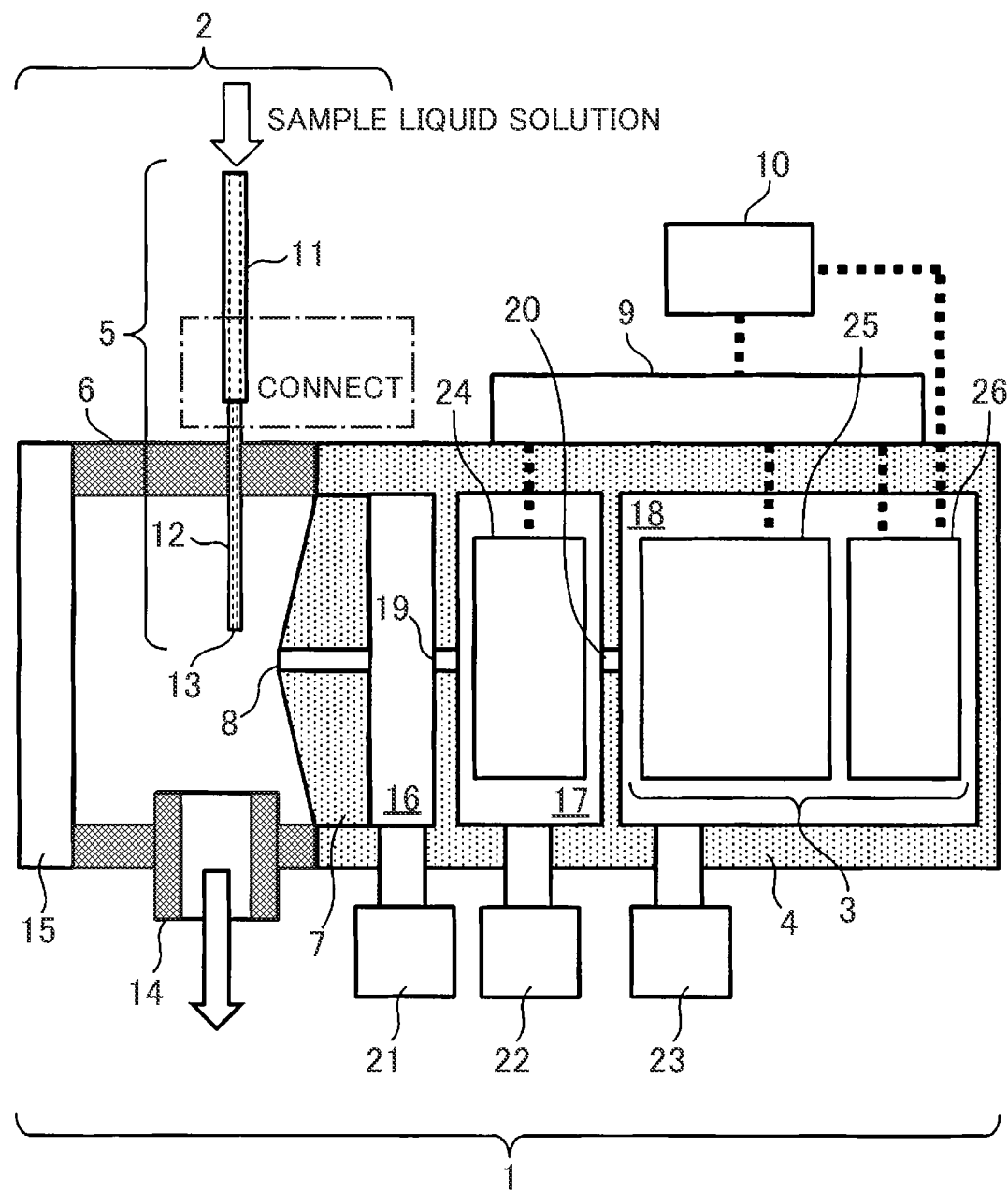
FIG. 3 is a block diagram of a mass spectrometer according to a first embodiment.

FIG. 3 shows is a block diagram of a mass spectrometer according to the first embodiment. A mass spectrometer 1 includes an ion source 2 and a vacuum chamber 4 having a mass spectrometry unit 3 and the like in its inside. The ion source 2 includes an ion producing unit 5, an ion source chamber 6, and the like.

The mass spectrometer 1 includes an introduction electrode 7 and a power supply 9. Ions produced at the ion source 2 are introduced into the inside of the vacuum chamber 4 from a hole 8 of an introduction electrode 7, and are analyzed at the mass spectrometry unit 3. To the mass spectrometry unit 3, various voltages are applied with the power supply 9. The voltage values and the timing of voltage application with the power supply 9 are controlled by a control unit 10.

The ion producing unit 5 includes a pipe 11 and a capillary 12. The pipe 11 supplies a sample liquid solution to the capillary 12, and thus the sample liquid solution is introduced into the capillary 12. The capillary 12 supplies the ions or the droplets of the introduced sample liquid solution. The supply of the ions or the droplets by the capillary 12 is performed by spraying the sample liquid solution from a downstream end 13 (capillary downstream-side end face) of the capillary 12, for example, with an electric field and the like. In the ion producing unit 5, the pipe 11 is connected to the capillary 12 such that no sample liquid solution leaks (the detail of the connection will be described later).

In the ion source 2, the ion source chamber 6, the vacuum chamber 4, and the connecting portions of these components are sometimes in a hermetically sealed state (or in a state close to hermetic seal) such that extra sample liquid solution (including that are not introduced into the vacuum chamber 4, vaporized components of droplets, or the like) does not leak to the outside of the mass spectrometer 1.

The mass spectrometer 1 may have an air outlet port 14 that eject this extra sample liquid solution (specifically vaporized components). Moreover, in order to observe the spray state of the downstream end 13 of the capillary 12, a window 15 formed of a transparent member, such as glass, may be provided at a part of the ion source chamber 6.

As shown in FIG. 3, the vacuum chamber 4 may include a plurality of vacuum chambers 16, 17, and 18 in its inside, and these vacuum chambers may be partitioned from each other. However, in this case, these vacuum chambers communicate with each other, for example, the vacuum chamber 16 and the vacuum chamber 17 communicate with each other through a hole 19 in a small diameter, and the vacuum chamber 17 and the vacuum chamber 18 communicate with each other through a hole 20 in a small diameter.

These holes 19 and 20 and the hole 8 of the introduction electrode 7 and the like are paths of ions, and a voltage may be applied to members having a hole (e.g., walls, which are specifically parts surrounding the hole). In this case, it is preferable to insulate a portion to which a voltage is applied from the housing part and the like of the vacuum chamber 4 through an insulator (not shown) and the like.

Note that the number of vacuum chambers may be one or more, the number is sometimes larger or smaller than the number shown in FIG. 3. The vacuum chambers 16, 17, and 18 are respectively evacuated with vacuum pumps 21, 22, and 23, and retained at vacuum degrees different from each other. For example, the vacuum chambers 16, 17, and 18 are respectively retained at about several hundred Pa, about several Pa, and about 0.1 Pa or less.

In the vacuum chamber 17, an ion transport unit 24 that transmits ions while converging ions is disposed. For the ion transport unit 24, a multipole electrode, an electrostatic lens, and the like can be used. The place at which the ion transport unit 24 is disposed is not limited to the inside of the vacuum chamber 17, and the ion transport unit 24 may be disposed in the vacuum chamber 16, the vacuum chamber 18, or the like, and any other vacuum chamber.

To the ion transport unit 24, voltages including a high frequency voltage, a direct current voltage, an alternating voltage, and combinations of these voltages are applied from the power supply 9.

The mass spectrometry unit 3 includes an ion analysis unit 25 and a detector 26, for example. For the ion analysis unit 25 that performs the separation and dissociation of ions, an ion trap, a quadrupole mass filter, a collision cell, a time-of-flight mass spectrometer (TOF), and the like and configurations combining these can be used.

The ions having passed through the ion analysis unit 25 are detected at the detector 26. For the detector 26, an electron multiplier, a micro-channel plate (MCP), and the like can be used. The ions detected at the detector 26 are converted into electrical signal and the like.

The mass spectrometer 1 includes the control unit 10. The electrical signal from the detector 26 is transmitted to the control unit 10, and the control unit 10 can analyze information such as the mass and strength of ions in detail.

The control unit 10 may be formed using a publicly known computer, and may include an operation unit and a storage unit, for example. The operation unit includes a processor, for example, and the storage unit includes a semiconductor memory and a magnetic disk, for example.

The control unit 10 may further include an input-output unit. The input-output unit receives an instruction input from a user, and outputs a control signal that performs control of voltages and the like. The storage unit of the control unit 10 may store a program, and a computer may implement functions as the control unit 10 by executing this program by the operation unit of the computer constituting the control unit 10.

For voltages to be supplied from the power supply 9 to the mass spectrometry unit 3, voltages including a high frequency voltage, a direct current voltage, an alternating voltage, and combinations of these voltages can be used.

Figure 4:
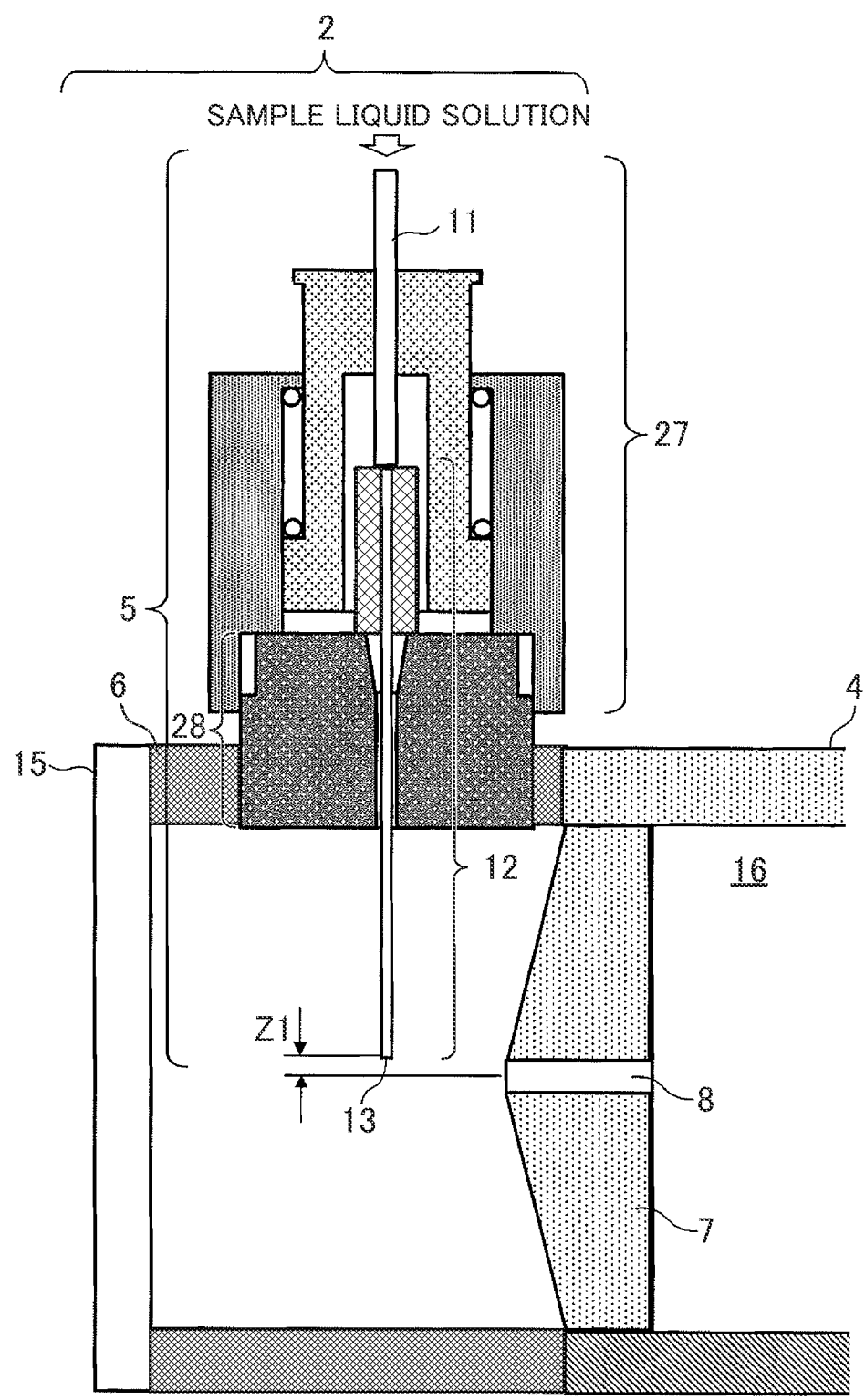
FIG. 4 is a block diagram of an ion producing unit according to the first embodiment.

Next, the connection method of directly connecting the pipe to the capillary, which is one of the features of the ion source 2 according to the first embodiment, will be described. FIG. 4 shows the configuration of the ion producing unit 5 in the ion source 2 according to the first embodiment.

The ion producing unit 5 in FIG. 4 includes a pipe retaining unit 27 that retains the pipe 11, the capillary 12, and a capillary retaining unit 28 that retains the capillary 12. The pipe retaining unit 27, the capillary 12, and the capillary retaining unit 28 can be easily assembled and disassembled. In the following, the elements of these components will be described in FIG. 5. Note that FIG. 3 shows the internal cavities of the pipe 11 and the capillary 12 by broken lines, and these internal cavities are omitted in FIG. 4 and the drawings after FIG. 4.

Figure 5A:
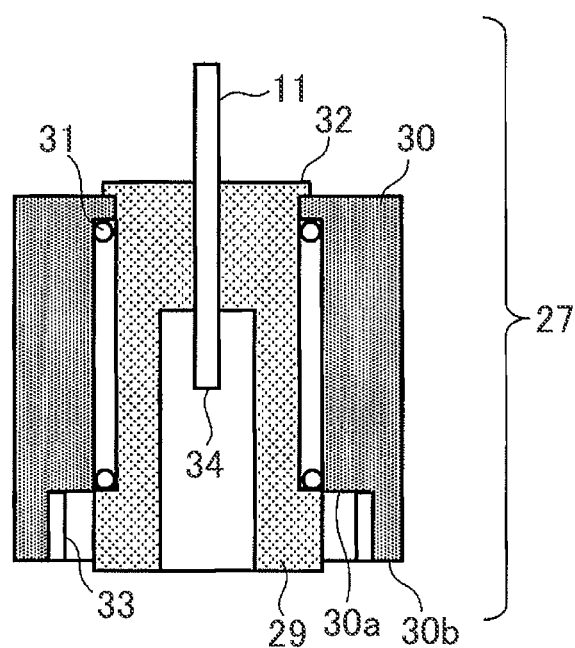
FIG. 5A is a block diagram of a component of the ion producing unit in FIG. 4.

FIG. 5A shows the pipe retaining unit 27. The pipe retaining unit 27 includes a pipe fixing part 29, a nut part 30, and a compression spring 31. The compression spring 31 energizes the pipe fixing part 29 against the nut part 30 in the downward direction (i.e., toward the capillary retaining unit 28). Note that FIG. 5A shows an example of a state in which the compression spring 31 completely extends, and when the pipe retaining unit 27 and the capillary retaining unit 28 engage with each other, the compression spring 31 is compressed. Note that in the present embodiment, although the pipe retaining unit 27 includes the compression spring 31, instead of this or in addition to this, the capillary retaining unit 28 may include a compression spring.

The pipe 11 is fixed to the pipe fixing part 29. The fixing of the pipe fixing part 29 to the pipe 11 can be implemented by various fixing means, such as adhesion and caulking.

Although the pipe fixing part 29 and the nut part 30 are assembled through the compression spring 31, desirably, a stopper 32 is provided such that the pipe fixing part 29 is not ejected due to the spring force of the compression spring 31. For the stopper 32, various mechanisms, such as a snap ring and a pin, can be used, not limited to the step as shown in FIG. 5A. The nut part 30 has a female screw part 33 on its inner side.

The pipe 11 is fixed to the pipe retaining unit 27. The pipe 11 has a downstream end face 34 (pipe downstream end face) on the downstream side. The downstream end face 34 is formed in a structure in which face seal is feasible. Particularly, in order to improve the accuracy of face seal, the downstream end face 34 is desirably processed to reduce surface roughness.

Figure 5B:
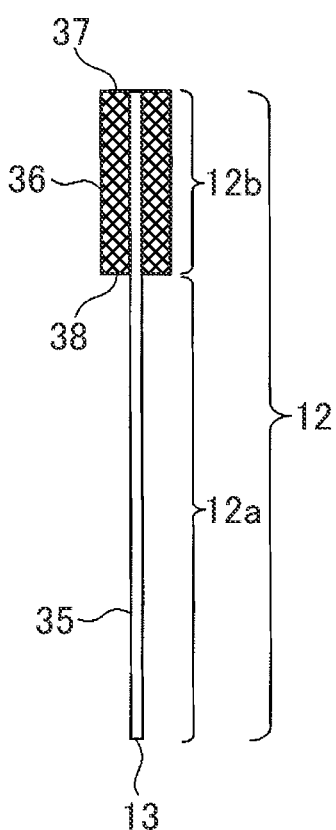
FIG. 5B is a block diagram of a component of the ion producing unit in FIG. 4.

FIG. 5B shows the capillary 12. The capillary 12 includes a small-diameter part 12a having its outer diameter relatively small and a large-diameter part 12b having its outer diameter larger than that of the small-diameter part 12a. The outer diameter of the small-diameter part 12a can be set to about 1 mm or less, or 1 mm or less, for example, and the outer diameter of the large-diameter part 12b can be set to about 1 mm or more, or 1 mm or more, for example.

The small-diameter part 12a is formed of a small-diameter member 35 having a first outer diameter, for example. The large-diameter part 12b is formed of a large-diameter member 36 having a second outer diameter, for example, larger than the first outer diameter. The capillary 12 has the large-diameter member 36 on the upstream side (on the upper side in FIG. 5B). The large-diameter member 36 has a cylindrical through cavity in its inside, and the small-diameter member 35 is inserted into the through cavity to be fixed.

The of the small-diameter member 35 and the large-diameter member 36 desirably have an integrated configuration, and for a method of integration, various methods, such as various manners of welding and various manners of adhesion, can be used. In the case of using a brazing method as an example of welding, desirably, the small-diameter member 35 is inserted into the inner side of the large-diameter member 36, and a brazing material is poured into a gap portion between the inner circumferential surface of the member of the large-diameter member 36 and the outer circumferential surface of the small-diameter member 35 for welding. This is because with this configuration, the small-diameter member 35 extends along the entire length of the capillary 12 to uniformize the inner diameter of the capillary 12.

Although it depends on the conditions, such as the flow rate of the sample liquid solution, the inner diameter of the capillary 12 can be set to about 1 mm or less, or 1 mm or less, for example.

The capillary 12 has a capillary upstream-side end face on the upstream side. In the present embodiment, as shown in FIG. 5B and other drawings, the capillary upstream-side end face is formed by an upstream side end face 37 of the large-diameter part 12b. The upstream side end face 37 is formed in a structure in which face seal is feasible. Particularly, in order to improve the accuracy of face seal, the upstream side end face 37 is desirably processed to reduce surface roughness.

As described above, the outer diameter of the large-diameter member 36 is set to about 1 mm or more, or 1 mm or more, and thus it is possible to ensure the ease of handling, such as the insertion and extraction of the capillary 12, and the range of face seal with the upstream side end face 37.

The large-diameter member 36 has a downstream side face 38 as a face on the downstream side on the opposite side (downstream side) of the upstream side end face 37. The downstream side face 38 forms a face on the downstream side (large-diameter part downstream side face) of the large-diameter part.

Moreover, the downstream-side end face of the capillary 12 is formed at the downstream end 13 of the capillary 12. The outer diameter of the upstream side end face 37 is larger than the outer diameter of the downstream end 13.

Figure 5C:
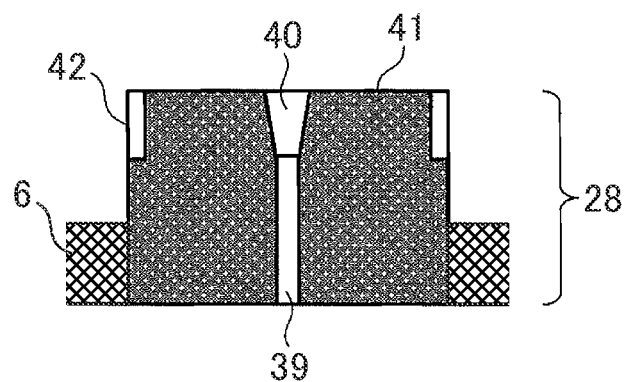
FIG. 5C is a block diagram of a component of the ion producing unit in FIG. 4.

FIG. 5C shows the capillary retaining unit 28. The capillary retaining unit 28 has a hole 39 into which the small-diameter member 35 of the capillary 12 is inserted. The hole 39 is formed such that the downstream end 13 of the capillary 12 is passable through the hole 39. With the provision of a tapered part 40 at the upstream side inlet of the hole 39, it is possible to smoothly insert the downstream end 13 of the capillary 12 from the upstream side (however, a configuration with no tapered part 40 can also be formed).

The capillary retaining unit 28 has an installation face 41 facing the downstream side face 38. The installation face 41 is formed such that the downstream side face 38 of the large-diameter member 36 can be installed. Moreover, the capillary retaining unit 28 has a male screw part 42. Note that according to the present embodiment, it is unnecessary to remove the capillary retaining unit 28 from the housing part, such as the ion source chamber 6 when the capillary 12 is replaced.

Next, the mounting process of the capillary 12 in the replacement work will be described. In the mounting process, first, the downstream end 13 of the small-diameter member 35 of the capillary is inserted from the upstream side into the hole 39 of the capillary retaining unit 28, and the downstream side face 38 is contacted with the installation face 41 (in the state shown in FIG. 6).

Figure 6:
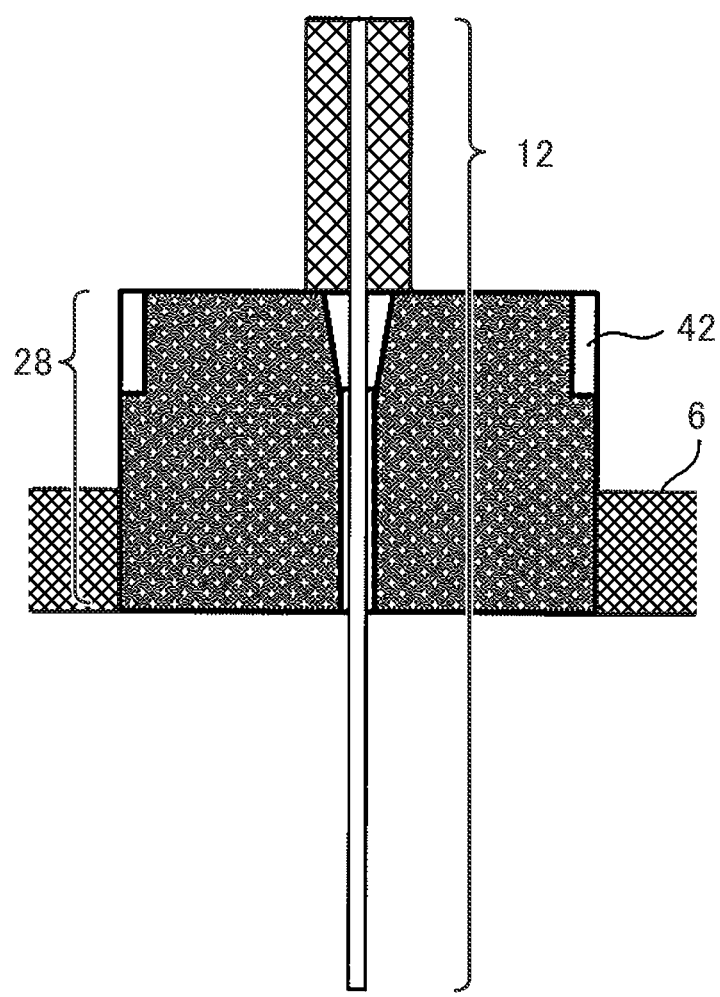
FIG. 6 is a block diagram of a state in which a capillary retaining unit in FIG. 5C is combined with a capillary in FIG. 5B.

After that, to the male screw part 42 of the capillary retaining unit 28 in configuration in the state shown in FIG. 6, the female screw part 33 of the pipe retaining unit 27 is screwed. In the screwing, the nut part 30 is rotated with respect to the capillary retaining unit 28.

As the nut part 30 is rotated (e.g., in the case of a right screw, the screw is rotated clockwise), an internal lower end face 30a of the nut part 30 comes close to the installation face 41 of the capillary retaining unit 28, and finally, the internal lower end face 30a is in contact with the installation face 41 to achieve the state in which the nut part 30 is no longer rotatable (in the state in FIG. 4). In other words, the female screw part 33 and the male screw part 42 become coupling means that couples the pipe retaining unit 27 with the capillary retaining unit 28.

As described above, in the present embodiment, the internal lower end face 30a of the nut part 30 acts as the positioning face of the pipe retaining unit 27, and the installation face 41 of the capillary retaining unit 28 acts as the positioning face of the capillary retaining unit 28. These positioning faces are joined to each other, and thus the pipe retaining unit 27 and the capillary retaining unit 28 are positioned to each other and fixed.

Moreover, in the present embodiment, the capillary retaining unit 28 is coupled with the pipe retaining unit 27 through a direct-acting mechanism, and particularly, the direct-acting mechanism a screwing mechanism.

The compression spring 31 energizes and couples the capillary retaining unit 28 and the pipe fixing part 29 facing each other. As a result, the downstream end face 34 of the pipe 11 contacts the upstream side end face 37 of the capillary 12. Furthermore, as the nut part 30 is rotated, the length of the compression spring 31 is gradually shortened in the state in which the downstream end face 34 of the pipe 11 is in contact with the upstream side end face 37 of the capillary 12, and the pipe 11 and the capillary 12 are pressed against each other. As a result, sealing force is produced between the pipe 11 and the capillary 12.

As described above, the capillary retaining unit 28 and the pipe retaining unit 27 are disposed such that the capillary 12 is connected to the pipe 11 by bringing the upstream side end face 37 of the large-diameter member 36 into contact with the downstream end face 34 of the pipe 11.

As the nut part 30 is further rotated, the internal lower end face 30a of the nut part 30 contacts the installation face 41 of the capillary retaining unit 28, and at this time point, the nut part 30 is not further rotatable. Here, the length of the compression spring 31 to be compressed is a constant length that is determined by the shape of the nut part 30 and the like, and thus the sealing force produced by the compression spring 31 is constant. Therefore, it is possible to apply the same sealing force between the downstream end face 34 of the pipe 11 and the upstream side end face 37 of the capillary 12 every time on the mounting work that occurs for replacement and the like of the pipe 11 or the capillary 12 (high sealing reproducibility).

Figure 1:
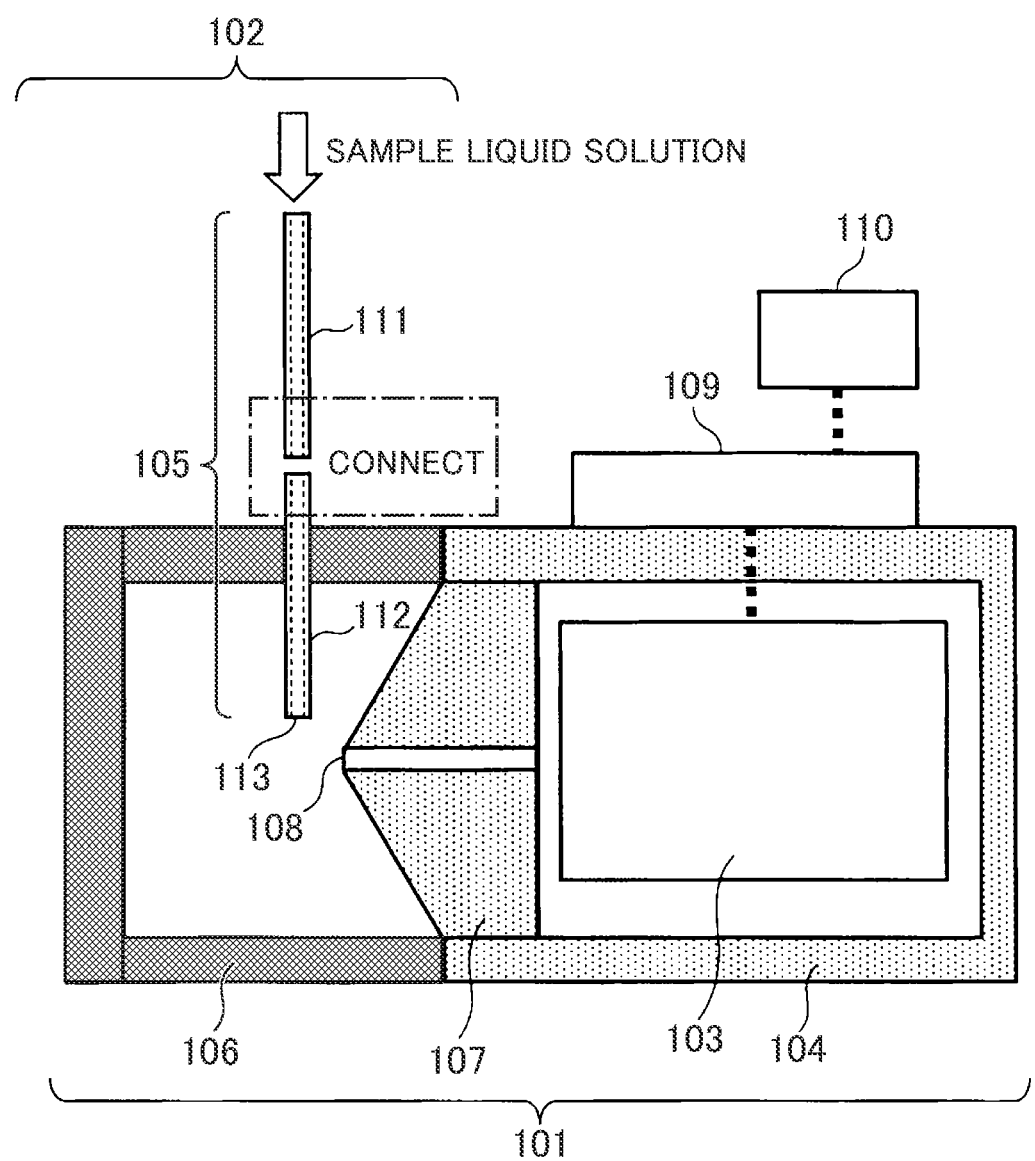
FIG. 1 is a block diagram of a typical conventional mass spectrometer.
Figure 2:
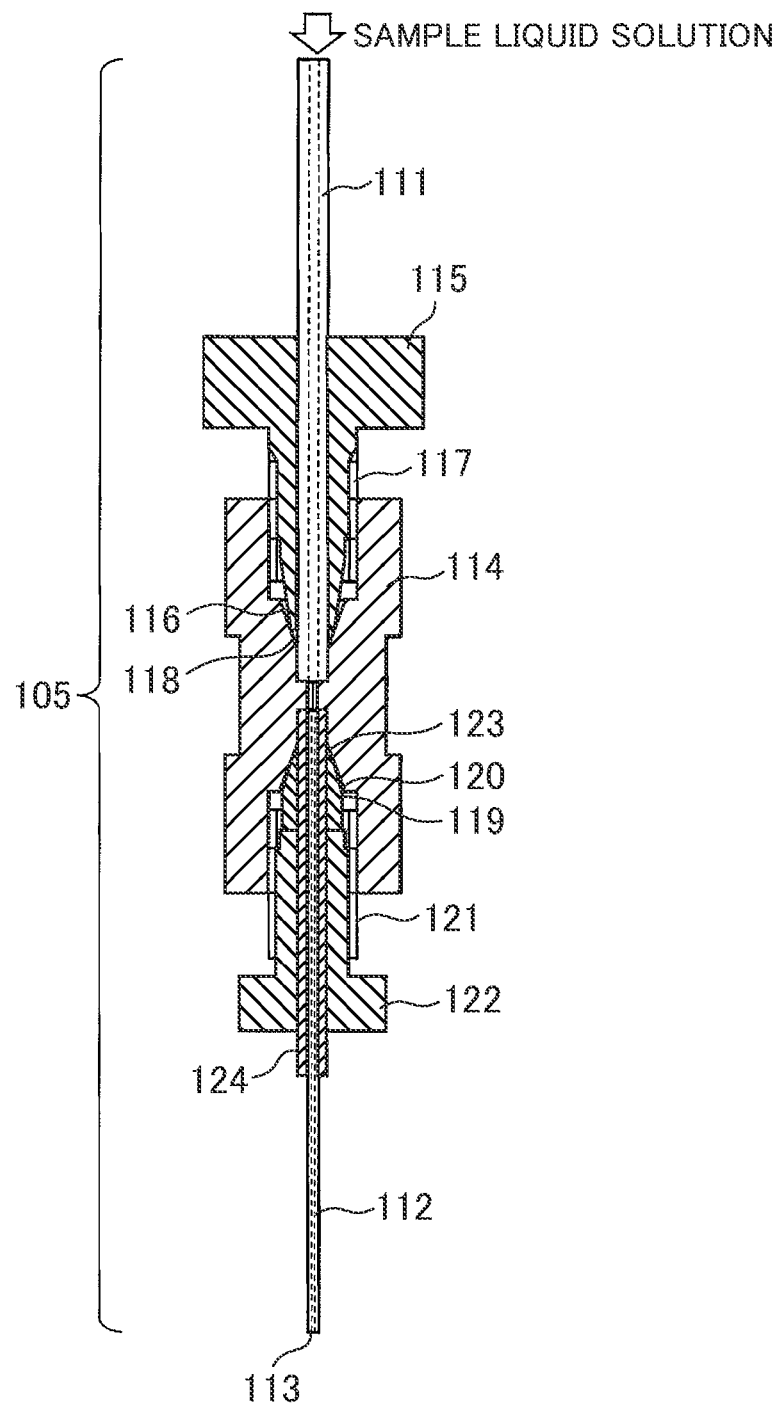
FIG. 2 is a diagram showing the connection of a pipe to a capillary in "Waters Micromass Quattro Premier Mass Spectrometer Operator's Guide" 7.12.2 "Removing the Existing Capillary" and 7.12.3 "Installing the New Capillary", online, Internet <URL:https://www.waters.com/waters/supportList.htm?cid=511442&local e=ja_JP>.

In the conventional ion source (FIG. 2) descried in Non-Patent Literature 1, the result of the fastening work of the connector 115 and the set screw 122 depends on the skill level of an operator. For example, fastening is performed with a tool, such as a spanner, or hand fastening and the like, which might lead to the occurrence of leakage or the breakage of a component due to over fastening. In contrast to this, the ion source according to the present embodiment is capable of achieving constant positioning by rotating the nut part 30 to a position at which no further rotation is allowed regardless of the skill level the operator.

Moreover, in the conventional ion source (FIG. 2) described in Non-Patent Literature 1, the connector 115 and the set screw 122 have to be fastened while the pipe 111 and the capillary 112 are pressed against the union 114. Thus, the fixing position of the capillary 112 in the longitudinal direction is not reproduced, and the positional relationship between the downstream end 113 and the hole 108 of the introduction electrode 107 varies, which possibly leads to a factor that degrades the reproducibility of analysis sensitivity.

In contrast to this, in accordance with the ion source according to the present embodiment, the internal lower end face 30a of the nut part 30 contacts the installation face 41 of the capillary retaining unit 28, and thus a position Z1 of the downstream end 13 of the capillary 12 (see FIG. 4, for example, the distance from the downstream end 13 of the capillary 12 in the axial direction to the center of the hole 8 of the introduction electrode 7) is the same every time (high assemble reproducibility). Thus, variations in the analysis sensitivity are also decreased (high analysis reproducibility). Moreover, since the downstream end face 34 of the pipe 11 directly contacts the upstream side end face 37 of the capillary 12, the dead volume is eliminated. Therefore, for example, the replacement time of the sample liquid solution is shortened, and it is also possible to reduce carry-over (high analysis stability).

The description of the dismounting process in the replacement work of the capillary 12 is omitted because the above-described procedures are basically preformed in a reverse manner. From the description above, the replacement of the capillary 12 in the present configuration is performed by only two processes of mounting (or dismounting) of the pipe retaining unit 27 and mounting (or dismounting) of the capillary 12, and it is unnecessary to dismount the ion producing unit 5 from the housing part, such as the ion source chamber 6 (high maintainability).

Typically, the inner diameter of the capillary in the ion source is considerably small, the capillary has to be frequently replaced depending on the type of sample liquid solution or the use conditions and the like. Regarding this point, in the conventional ion source described in Non-Patent Literature 1, the replacement work is complicated and assemble reproducibility is also degraded. In the rough description of actual replacement procedures of the conventional configuration with reference to FIG. 2, first, the connector 115 is loosened to remove the pipe 111, and then the ion producing unit 105 is pulled out from the housing part, such as the ion source chamber 106. After that, the set screw 122 is loosened to remove the capillary 112. The work of setting a new capillary 112 is basically reverse the above-described work. In the comparison with such a complicated process, the ion source according to the present embodiment is capable of performing the replacement of the capillary 12 by a simpler process.

In the present embodiment, the configuration is described in which the capillary retaining unit 28 has the male screw part 42 and the pipe retaining unit 27 has the female screw part 33. However, a reverse manner may be fine.

Moreover, in the present embodiment, the configuration is described in which the internal lower end face 30a of the nut part 30 and the installation face 41 of the capillary retaining unit 28 act as the positioning faces and the reproducibility of the sealing force and the position is achieved by the contact between the internal lower end face 30a and the installation face 41. However, other parts may be formed as the positioning faces, or the sealing force and the positions may be regulated by a configuration other than the positioning faces using the other members. For example, a configuration may be provided in which the nut part 30 is rotatable until an outer lower end face 30b of the nut part 30 contacts the lower end face of the male screw part 42 of the capillary retaining unit 28 and the nut part 30 is brought into a state in which the nut part 30 is not further rotatable at the time point at which the contact of the outer lower end face 30b contacts the lower end face.

Furthermore, in the present embodiment, the coupling means using translatory movement by rotating the screw with the nut part is described. According to such a configuration, the configuration can be made simple. However, the coupling means can also be implemented using another mechanism. The mechanism may be a manual mechanism or may be an automatic mechanism. various direct-acting mechanisms, such as a lever mechanism, cam mechanism, rack gear mechanism, slide mechanism, and piston mechanism, may be used as well. In addition, the configuration is made simple when the direct-acting mechanism is used. However, mechanisms other than the direct-acting mechanism may be used.

Moreover, in the present embodiment, the configuration is described in which the spring force by the compression spring 31 of high convenience is used. However, another elastic body may be used when a load can be defined by the compressed amount. For example, when a system that can manage the torque amount of rotation of the screw (i.e., sealing force) can be used, a configuration using no compression spring 31 can be formed. For example, a compression spring other than the compression coil spring may be used, a tension spring may be used, rubber or another elastic member may be used, or an elastic structure formed using a plurality of members may be used.

In the configuration of the first embodiment described above, the pipe is directly joined to the capillary using the spring force to achieve face seal, and thus it is possible to eliminate or decrease a dead volume at the connecting portion of the pipe to the capillary. Moreover, it is possible to achieve an ion source and a mass spectrometer that enable high analysis stability, high analysis reproducibility, and high maintainability.

Second Embodiment

A second embodiment is an ion source and a mass spectrometer having a resin layer on the end face (the sealing face) of a capillary or a pipe. For convenience, differences from the first embodiment will be mainly described.

Figure 7:
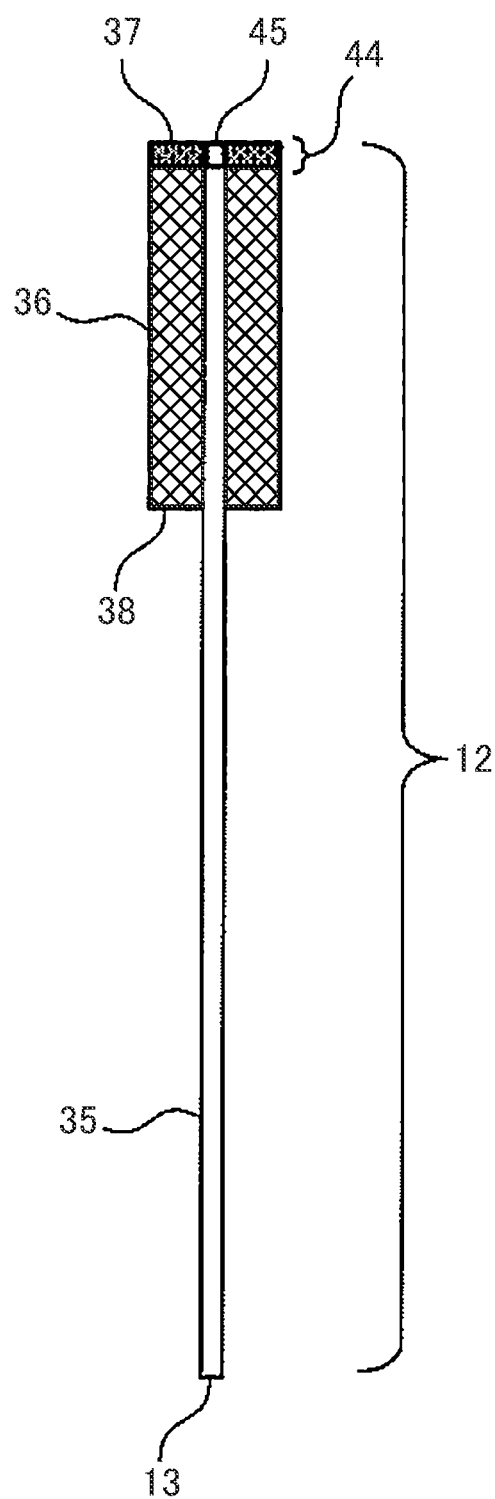
FIG. 7 is a block diagram of a capillary according to a second embodiment.

FIG. 7 shows the configuration of a capillary 12 according to the present embodiment. The capillary 12 shown in FIG. 7 has a feature in which an upstream side end face 37 is formed of a resin layer 44. When the upstream side end face 37 has the resin layer 44, high sealing performance due to softness specific to a resin can be advantageously achieved.

Moreover, the resin layer 44 is provided to adjust the progress of degradation at the connecting portion of a pipe 11 to a capillary 12. For example, in the field in which clogging and the like are likely to occur in the capillary 12, it is assumed that the frequency of replacement of the capillary 12 is higher than the frequency of replacement of the pipe 11. In such a case, the capillary 12 is provided with the resin layer 44 having its hardness lower than the hardness of a downstream end face 34 of the pipe 11, and thus it is possible to delay degradation on the pipe 11 side, and in other words, it is possible to prolong lifetime of a member on a side where the frequency of replacement is low (a member whose lifetime is desired to be long).

For the resin layer 44, various resins can be used. However, in many cases, it is desirable to use fluorine resins excellent in chemical resistance (PTFE, PCTFE, PFA, FEP, ETFE, and the like) or a polyether ether ketone resin (PEEK) and the like.

The resin layer 44 has a hole 45. The inner diameter of the hole 45 is made larger than the inner diameter of the pipe 11 and the inner diameter of the capillary 12, which enables absorption of a displacement of the center axes of the pipe 11 and the capillary 12 more or less.

The thickness of the resin layer 44 can be set to about 1 mm or less, or 1 mm or less. The resin layer 44 may be integrated with a large-diameter member 36 by adhesion, welding, or the like, or may be fixed to the large-diameter member 36 by press fitting using a fitting part or caulking or the like.

Figure 8:
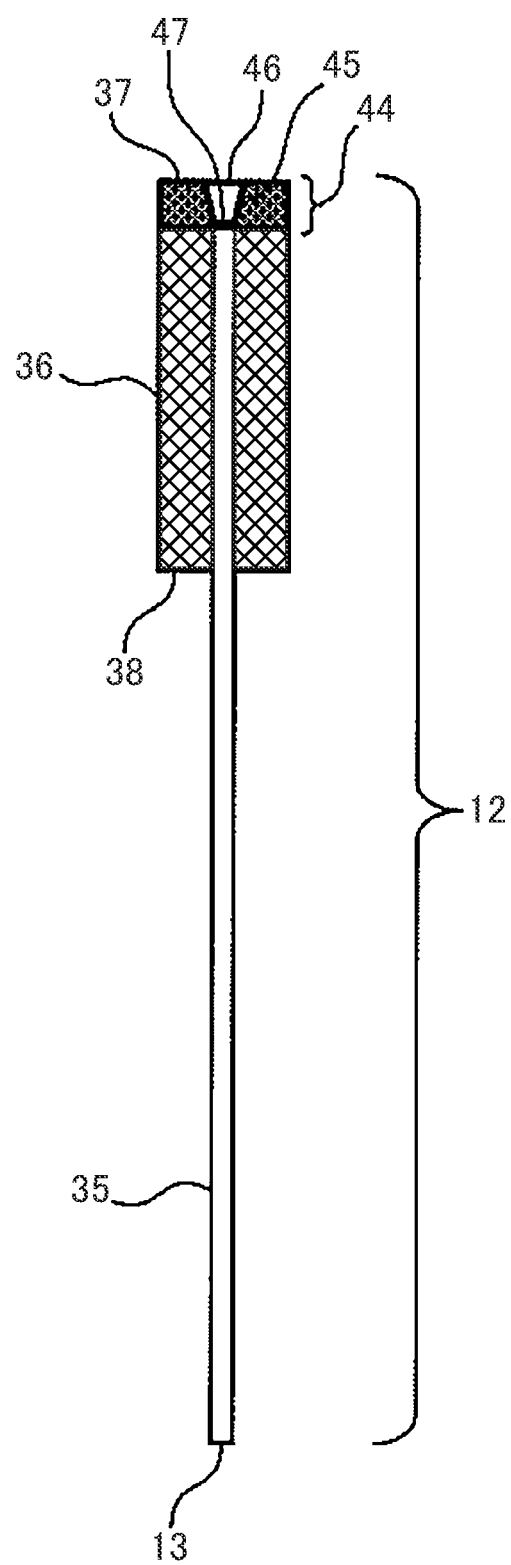
FIG. 8 is a block diagram of a capillary according to an exemplary modification of the second embodiment.

FIG. 8 shows the configuration of the capillary 12 according to an exemplary modification of the second embodiment. In order to smooth the flow of a liquid solution at the site of the hole 45, this configuration may be provided. The feature of the hole 45 of the resin layer 44 in FIG. 8 is that an opening 46 on the upstream side is larger than an opening 47 on the downstream side. Thus, it is possible to achieve a smooth flow.

Similarly to FIG. 7, also in the configuration in FIG. 8, it is possible to absorb the displacement in the center axes of the pipe 11 and the capillary 12. Moreover, according to the configuration in FIG. 8, in the case in which the inner diameter of the pipe 11 is larger than the inner diameter of the capillary 12, it is possible to smoothly connect the inner circumferential surfaces of the pipe 11 and the capillary 12 to each other. Conversely, in the case in which the inner diameter of the pipe 11 is smaller than the inner diameter of the capillary 12, the opening 46 on the upstream side may be made smaller than the opening 47 on the downstream side.

Figure 9:
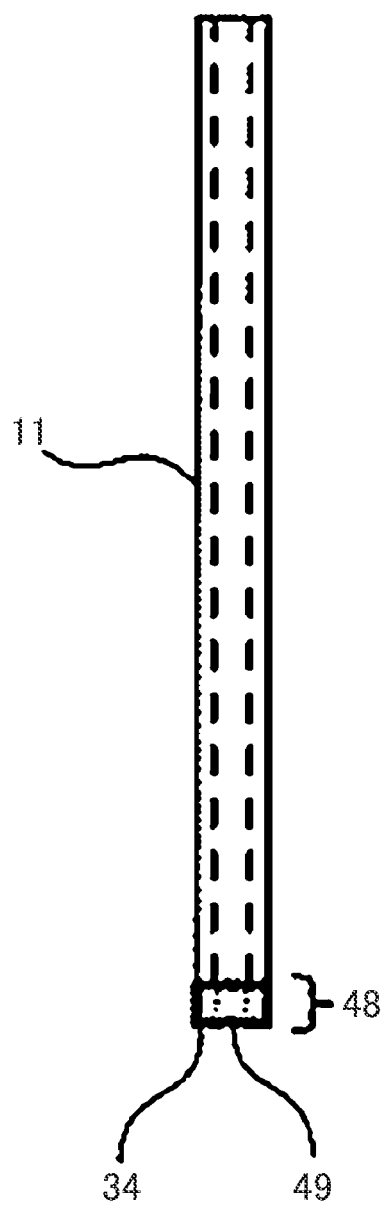
FIG. 9 is a block diagram of a pipe according to an exemplary modification of the second embodiment.

FIG. 9 shows the configuration of the pipe 11 according to the exemplary modification of the second embodiment. As described above, the downstream end face 34 of the pipe 11 may be formed of a resin layer 48 having a hole 49.

Note that the pipe 11 in FIG. 9 may be used together with the capillary 12 shown in FIG. 7 or the capillary 12 shown in FIG. 8, or together with the capillary 12 of the first embodiment. That is, it is possible to provide a configuration in which at least one of the upstream side end face 37 of the large-diameter member 36 or the downstream end face 34 of the pipe 11 has the resin layer.

In the configuration of the second embodiment described above, the sealing face has the resin layer, and thus it is possible to achieve a sealing performance specific to a resin, and it is possible to achieve an ion source and a mass spectrometer that are capable of absorbing the displacement at the center axis.

Figure 10:
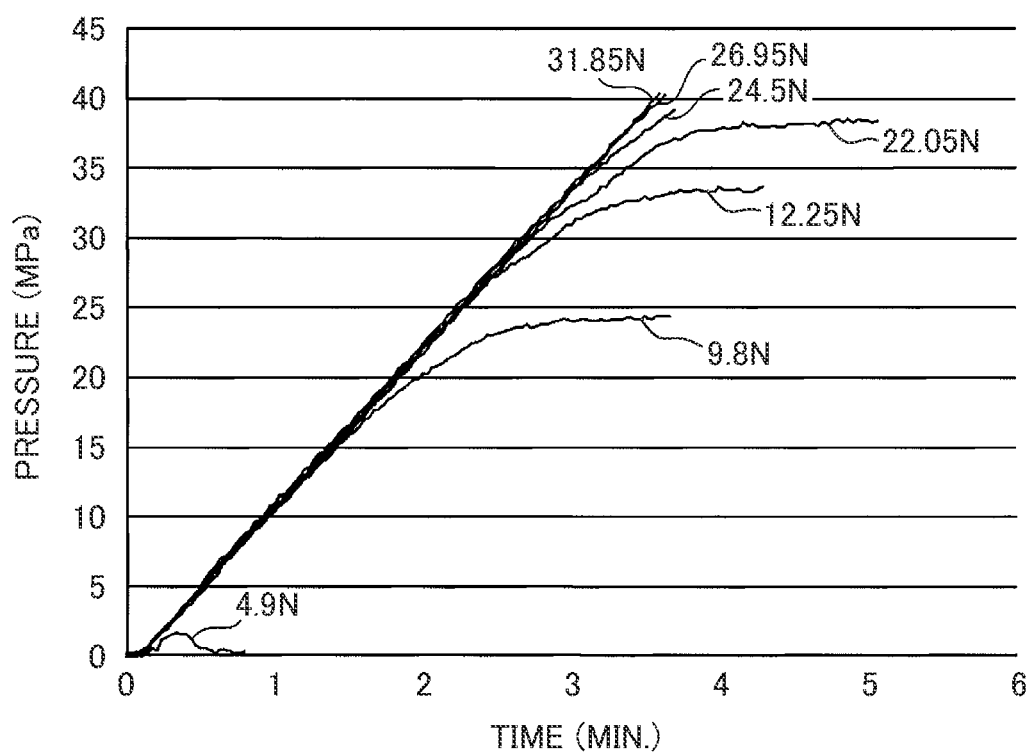
FIG. 10 is an experimental result of pressure resistance evaluation in a configuration in FIG. 7 (time-to-pressure plotting)

FIG. 10 describes a result of evaluation of pressure resistance using the capillary 12 in the configuration shown in FIG. 7 and the pipe 11 in the configuration of the first embodiment. In regard to the configuration of the pipe 11, the downstream end face 34 was made of stainless steel, and the part contacting with the capillary 12 has a ring shape having an outer diameter of 1.6 mm and an inner diameter of 0.3 mm. On the other hand, in regard to the configuration of the capillary 12, a configuration having the resin layer 44 made of a PEEK resin on the upstream side end face 37 was provided, and the inner diameter of the capillary 12 was sealed in order to increase a pressure.

Under these conditions, a result in which pressures at which a liquid solution (water:methanol=1:1) was delivered to the pipe 11 at a flow rate of 0.1 mL/min were plotted for respective spring forces (sealing forces) by a compression spring 31 are shown in FIG. 10. The horizontal axis expresses time. Since the inner diameter is sealed, the pressure increases over time, a leak occurs when the internal pressure exceeds the sealing force, and the plot deviates from the linear relationship between time and pressure.

Figure 11:
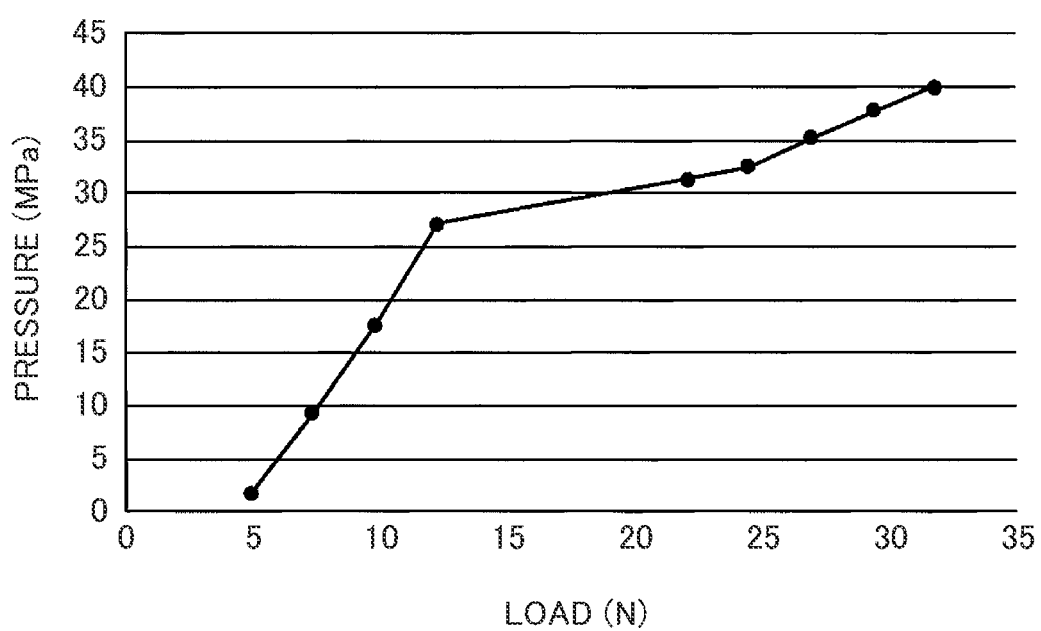
FIG. 11 is an experimental result of pressure resistance evaluation in a configuration in FIG. 7 (load-to-pressure plotting)

FIG. 11 shows a result in which the relationship between points (pressure) immediately before deviation and the load by the compression spring 31 was plotted. From this result, from the configuration in FIG. 7, it is shown that a pressure resistance of 40 MPa, which is sufficient as a typical ion source, is obtained. Note that in FIG. 10, data is partially omitted for the convenience of the drawings, and data in FIG. 10 does not correspond to data in FIG. 11 one to one.

Third Embodiment

A third embodiment is an ion source and a mass spectrometer having a rotation prevention pin at a capillary retaining unit. For convenience, differences from the first embodiment will be mainly described.

Figure 12:
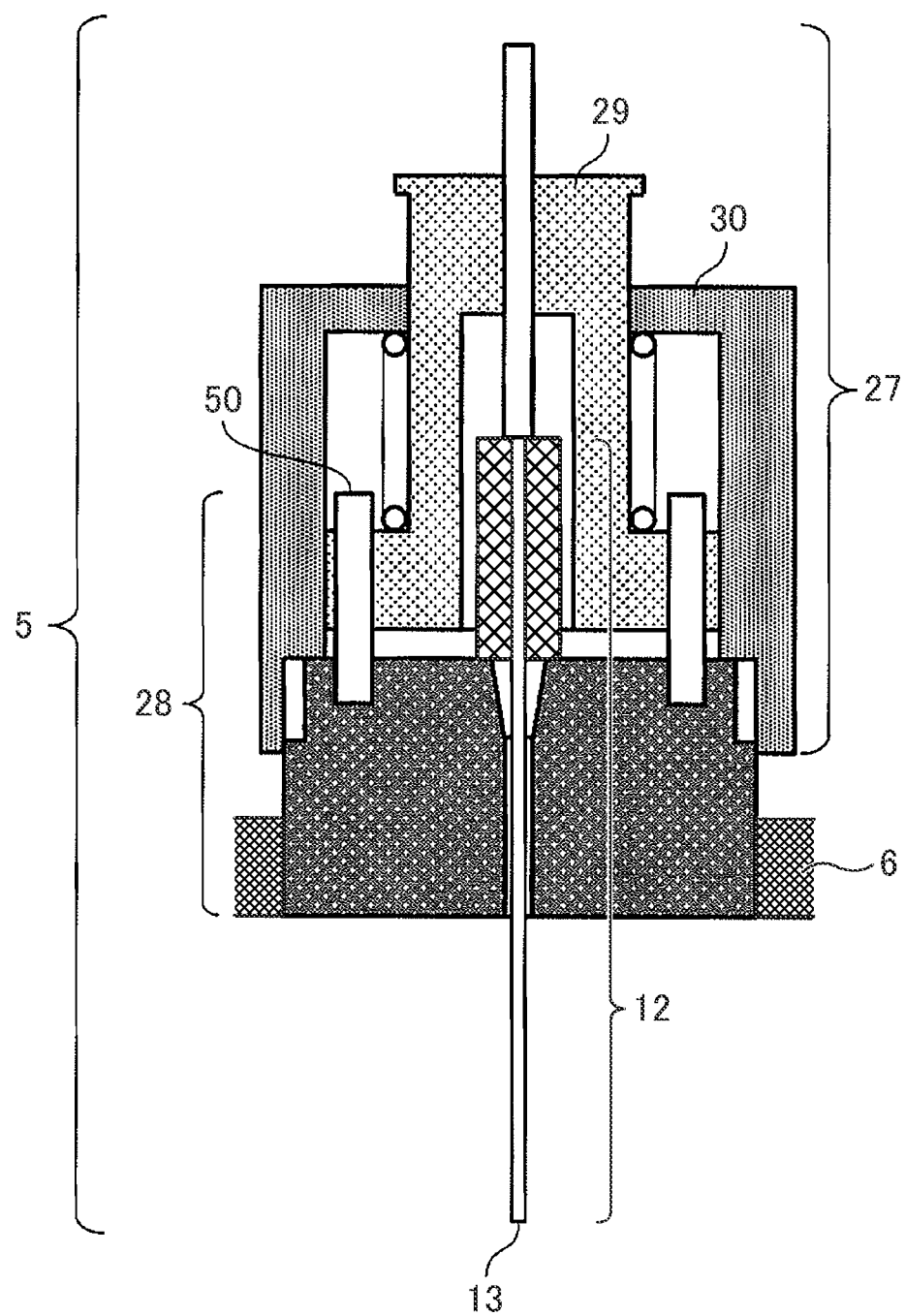
FIG. 12 is a block diagram of an ion producing unit according to a third embodiment.

FIG. 12 is a block diagram of an ion producing unit 5 of the third embodiment. The ion producing unit 5 of the third embodiment has a feature in which a capillary retaining unit 28 has a rotation prevention pin 50. The rotation prevention pin 50 is fixed to the capillary retaining unit 28 or integrally formed with the capillary retaining unit 28, and is formed in a cylindrical shape extending in parallel with the axis of a capillary 12, for example. FIG. 12 shows two rotation prevention pins 50.

A pipe fixing part 29 has a hole or a groove corresponding to the rotation prevention pin 50. Since the rotation prevention pin 50 engages with this hole or this groove, the travel of the rotation prevention pin 50 in the direction non-parallel with the axis is regulated. As described above, the rotation prevention pin 50 functions as a rotation prevention mechanism that prevents relative rotation between a pipe 11 and the capillary 12 (e.g., rotation about the axis of the capillary 12). Since the rotation prevention pin 50 becomes a guide, it is possible to prevent the pipe 11 from relatively rotating to the capillary 12 by the influence of the rotation operation of a nut part 30.

Note that, if the pipe 11 is rotated relatively to the capillary 12, a downstream end face 34 and an upstream side end face 37, which are sealing faces, are rotated while contacting with each other, and this might lead to early degradation of the sealing faces of the pipe 11 and the capillary 12. In contrast to this, in accordance with the ion producing unit 5 according to the present embodiment, for example, in the case in which the capillary 12 is replaced highly frequently, friction due to the rotation prevention pin 50 is prevent, and thus it is possible to prolong the lifetime of the pipe 11.

In the present embodiment, the configuration is described in which the capillary retaining unit 28 is provided with the rotation prevention pin 50. However, the pipe fixing part 29 may be provided with the rotation prevention pin 50, and the capillary retaining unit 28 may be provided with a hole or a groove corresponding to the rotation prevention pin 50.

Moreover, in the present embodiment, the rotation prevention mechanism is formed of the rotation prevention pin 50. However, the rotation prevention mechanism may be formed of another structure or another member. For example, various rotation prevention mechanisms, such as a key and a key groove, a projection and a guide groove, may be used.

In the configuration of the third embodiment as described above, it is possible to achieve an ion source and a mass spectrometer that have a long lifetime of components using the rotation prevention pin.

Fourth Embodiment

A fourth embodiment is an ion source and a mass spectrometer in a configuration in which the centering (axis alignment) of the center axes of a pipe and a capillary is made easier. For convenience, differences from the first embodiment will be mainly described.

Figure 13:
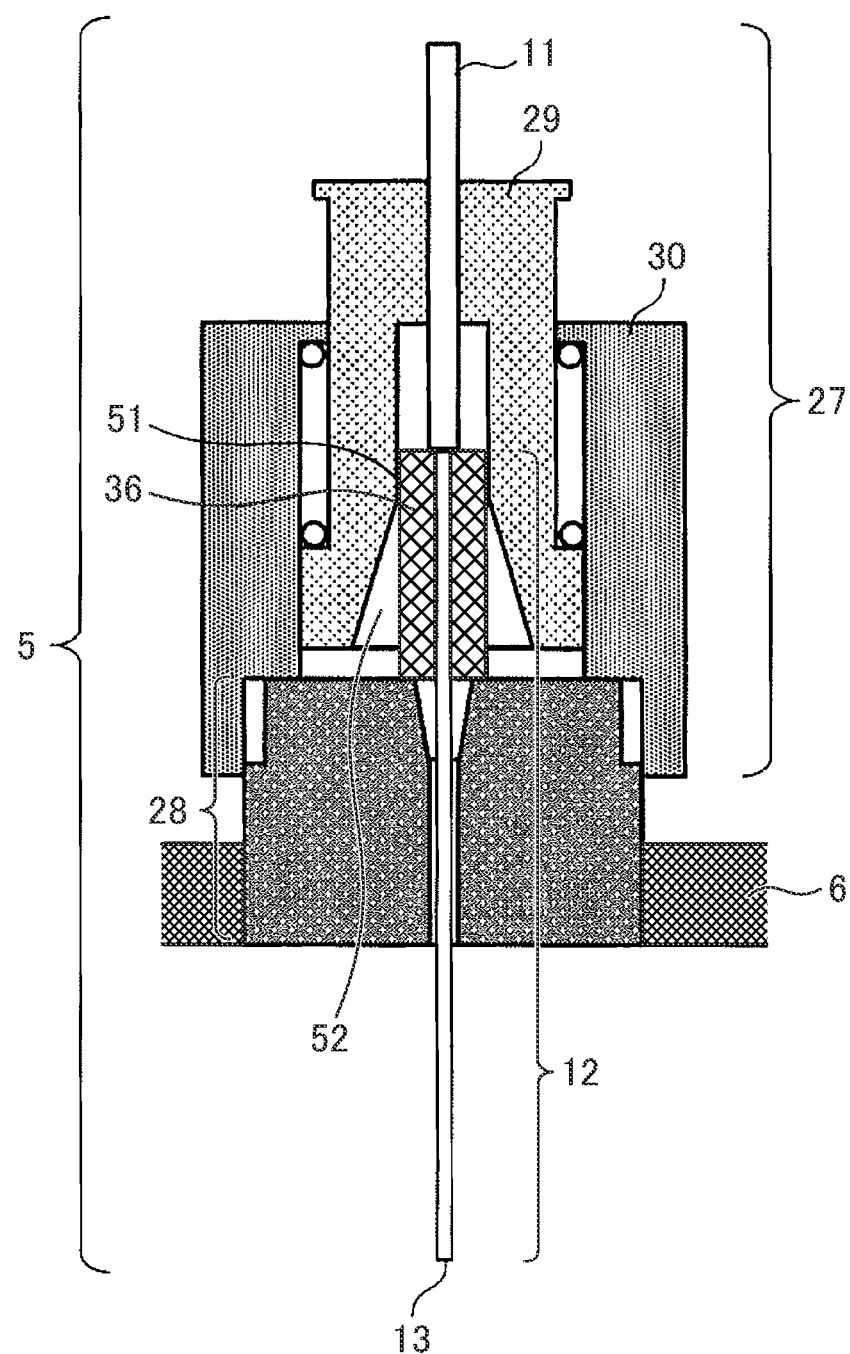
FIG. 13 is a block diagram of an ion producing unit according to a fourth embodiment.

FIG. 13 is a block diagram of an ion producing unit 5 according to the fourth embodiment. In the ion producing unit 5 in FIG. 13, a pipe fixing part 29 has a fitting part 51 on the inner side, and has a configuration in which the fitting part 51 guides a large-diameter member 36 of a capillary 12.

Since the pipe fixing part 29 also guides the outer diameter of a pipe 11, the center axes of the capillary 12 and the pipe 11 are more easily centered. Desirably, the pipe fixing part 29 has a tapered part 52 such that the insertion and extraction of the capillary 12 with respect to the pipe fixing part 29 is made much easier. The tapered part 52 may be simple beveling and the like. The tapered part or beveling may be applied to the large-diameter member 36 of the capillary 12 (in this case, a male tapered shape is formed in which the upstream side is pointed).

In the present embodiment, the centering configuration using the fitting part 51 is described. However, in addition to this, various centering configurations, such as a pin, groove, and slit, may be used.

In the configuration according to the fourth embodiment as described above, it is possible to achieve an ion source and a mass spectrometer that the pipe and the capillary are more easily centered.

Fifth Embodiment

A fifth embodiment is an ion source and a mass spectrometer having a contact pin in a capillary retaining unit. For convenience, differences from the first embodiment will be mainly described.

Figure 14:
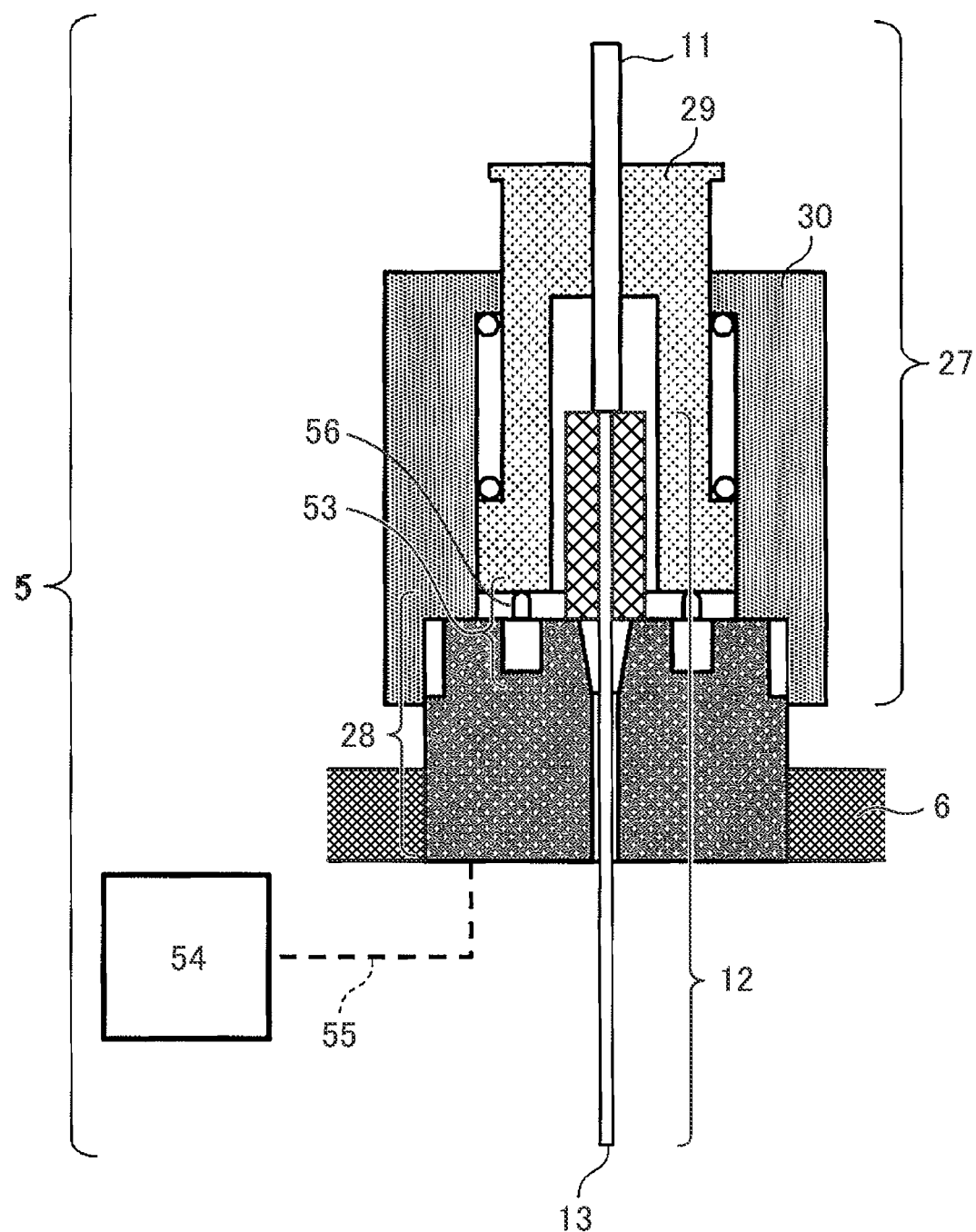
FIG. 14 is a block diagram of an ion producing unit according to a fifth embodiment.

FIG. 14 is a block diagram of an ion producing unit 5 according to the fifth embodiment. The ion producing unit 5 in FIG. 14 has a feature in which a capillary retaining unit 28 has a contact pin 53. The contact pin 53 is a conductor, and is made of a metal including copper or stainless steel, for example.

In the ion producing unit 5 of the present embodiment, a capillary 12 and the capillary retaining unit 28 are also made of a conductor (e.g., a metal), and a voltage can be applied across the capillary 12 and an introduction electrode 7 for use. Moreover, in the present embodiment, a pipe fixing part 29 and a nut part 30 of a pipe retaining unit 27 are also made of a conductor (e.g., a metal). As described above, that is, in the present embodiment, the pipe retaining unit 27 and the capillary retaining unit 28 both include a conducting member. Such a use form is frequently used in the ESI ion source.

In the configuration in FIG. 14, a voltage is applied to the capillary 12 through the capillary retaining unit 28. From a power supply 54 via a wire 55, a voltage is applied to the capillary retaining unit 28 unit. Since the capillary 12 contacts the capillary retaining unit 28, the voltage is also applied to the capillary 12.

The voltage applied from the power supply 54 ionizes a sample liquid solution introduced into the capillary 12, and the sample liquid solution is sprayed from the downstream end 13 (electrostatic spraying). The timing and voltage values of voltage application with the power supply 54 are controlled by a control unit 10. The value of the voltage to be applied to the capillary 12 is in the range in which the absolute value ranges from 1 kV to 10 kV, for example, with respect to the introduction electrode 7.

Note that in the case in which positive ions are produced, a voltage of +1 kV to +10 kV is applied to the capillary 12 with respect to the introduction electrode 7. In the case in which e negative ions are produced, a voltage of −1 kV to −10 kV is applied to the capillary 12 with respect to the introduction electrode 7. The flow rate of the sample liquid solution depends on the inner diameter of the capillary 12. However, the flow rate is set in the range of 1 nL/min. to 1 mL/min., for example.

Here, for comparison, a configuration is assumed in which the contact pin 53 is omitted in FIG. 14. Since the pipe fixing part 29 and the capillary 12 do not directly contact with each other, in such a configuration, a problem might occur due to floating in electric potential. For example, in the case in which the pipe fixing part 29 and a compression spring 31 are made of a metal and the materials of the pipe 11 and the nut part 30 are insulators, the electric potentials of the pipe fixing part 29 and the compression spring 31 might float with respect to the electric potentials of the capillary retaining unit 28 and the capillary 12. If such a potentially floated member is present, analysis might be unstable.

In contrast to this, in the present embodiment, since the contact pin 53 is in contact with both of the pipe fixing part 29 and the capillary retaining unit 28, the pipe fixing part 29 and the capillary retaining unit 28 are in conduction to be at the same electric potential, and a floated member is eliminated.

As described above, the contact pin 53 functions as a unit that equalizes the electric potentials of the conducting members of the pipe retaining unit 27 and the capillary retaining unit 28.

The contact pin 53 may have a spring (not shown) and the like in its inside, and the contact pin 53 may be configured such that a probe part 56 comes out and goes in the longitudinal direction by the action of this spring. When the pipe retaining unit 27 is mounted, the probe part 56 is pressed against the pipe fixing part 29 by the action of the internal spring, and thus the pipe retaining unit 27 and the capillary retaining unit 28 are at the same electric potential.

In the present embodiment, the configuration is described in which the capillary retaining unit 28 has the contact pin 53. However, a configuration may be provided in which the pipe fixing part 29 has the contact pin 53. In addition to the contact pin 53, various configurations that make the electric potentials of the pipe retaining unit 27 and the capillary retaining unit 28 equal, such as a plug socket and plate spring, may be used.

In the configuration of the fifth embodiment as described above, it is possible to achieve an ion source and a mass spectrometer that have no component floating in electric potential by a contact pin.

Sixth Embodiment

A sixth embodiment is an ion source and a mass spectrometer in which a capillary retaining unit has a gas spray pipe. For convenience, differences from the first embodiment will be mainly described.

Figure 15:
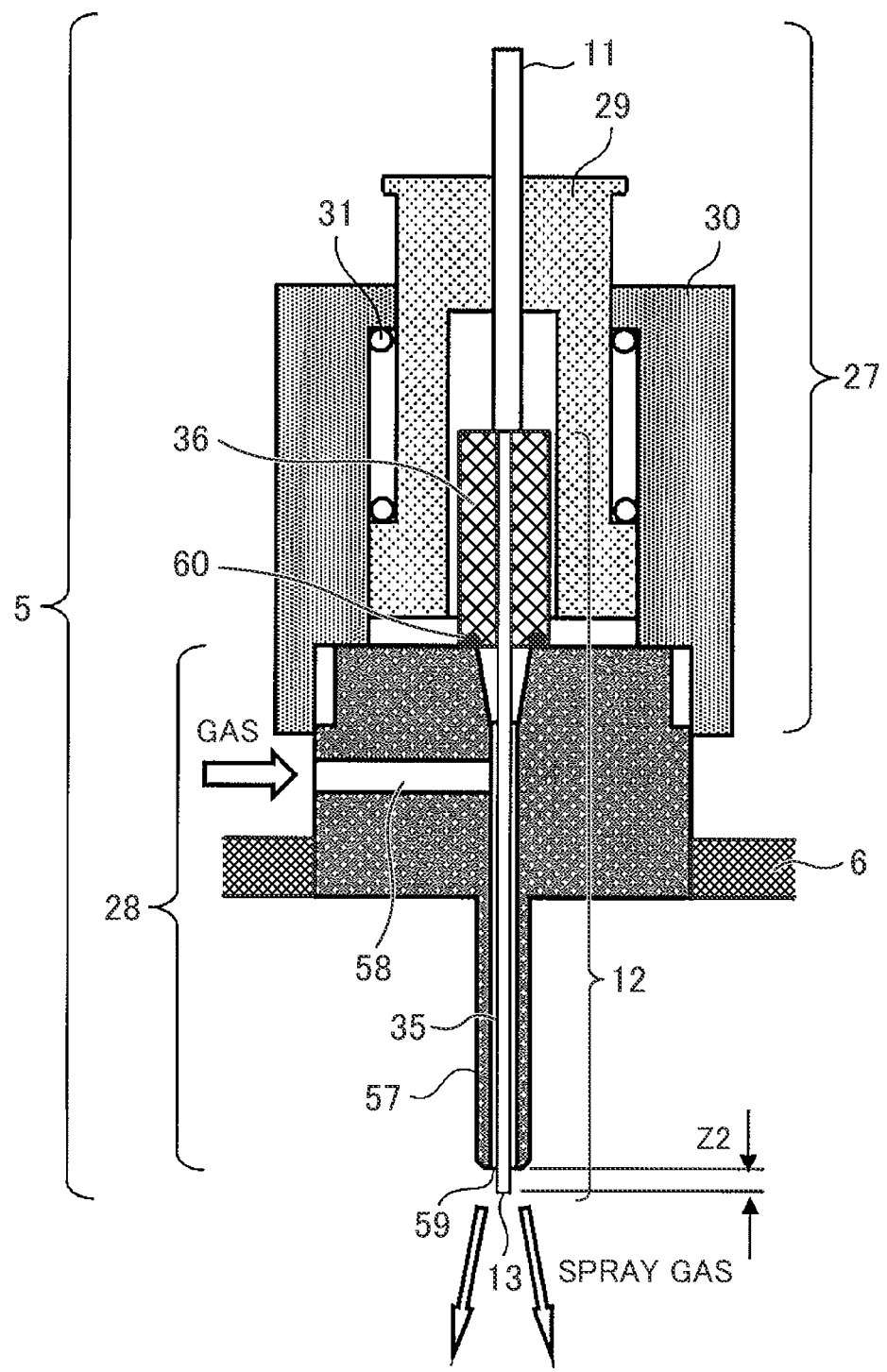
FIG. 15 is a block diagram of an ion producing unit according to a sixth embodiment.

FIG. 15 is a block diagram of an ion producing unit 5 of the present embodiment. The ion producing unit 5 of the present embodiment has a feature in which a capillary retaining unit 28 has a gas spray pipe 57. From an opening 59 of the gas spray pipe 57 disposed on the outer side of a small-diameter member 35 of a capillary 12, a gas introduced from a gas inlet port 58 is sprayed. In FIG. 15, a configuration is described in which the capillary retaining unit 28 is integrated with the gas spray pipe 57. However, the capillary retaining unit 28 and the gas spray pipe 57 may be separate components.

In the ESI ion source, a spray gas is sometimes used depending on the conditions for the flow rate of a sample liquid solution. In the process of the principle of ion production by the ESI method, the droplets of the sample liquid solution are repeatedly divided to finally form considerably fine droplets for ionization. The droplets that are not sufficiently fine in the process of ionization include neutral droplets, charged droplets, and the like. These droplets are vaporized or evaporated, and this leads to the possibility of improving ionization efficiency. To this end, a spray gas by the gas spray pipe 57 can be used.

In regard to the flow rate of a spray gas, an inert gas, such as nitrogen or argon, can be used in the range of 0.5 to 10 L/min., for example. Moreover, in the case of reinforcing the vaporization of droplets, a method (not shown) can also be used in which a heated gas (e.g., temperatures of about 800° C. or less, or 800° C. or less) is sprayed further from the outer side. The flow rate of the heated gas is in the range of 0.5 to 50 L/min., for example, and an inert gas, such as nitrogen or argon, can be similarly used.

In the configuration in which the spray gas is used, in order to seal the gas, a sealing material 60 is disposed on a large-diameter member 36 of the capillary 12. For the sealing material 60, various configurations, such as an O-ring and a gasket, can be used. In the present embodiment, the configuration is described in which the sealing material 60 is disposed on the large-diameter member 36. However, a configuration may be provided in which the sealing material 60 is disposed on the capillary retaining unit 28.

In the present embodiment, not only the reproducibility of the position Z1 (FIG. 4) of the downstream end 13 of the capillary 12 as in the first embodiment, but also the reproducibility of a projecting amount Z2 of the capillary 12 projecting from the tip end of the gas spray pipe 57 is high.

In the configuration of the sixth embodiment as described above, it is possible to achieve an ion source and a mass spectrometer that has a high vaporization efficiency of the sample liquid solution using a gas spray pipe.

Figure 16:
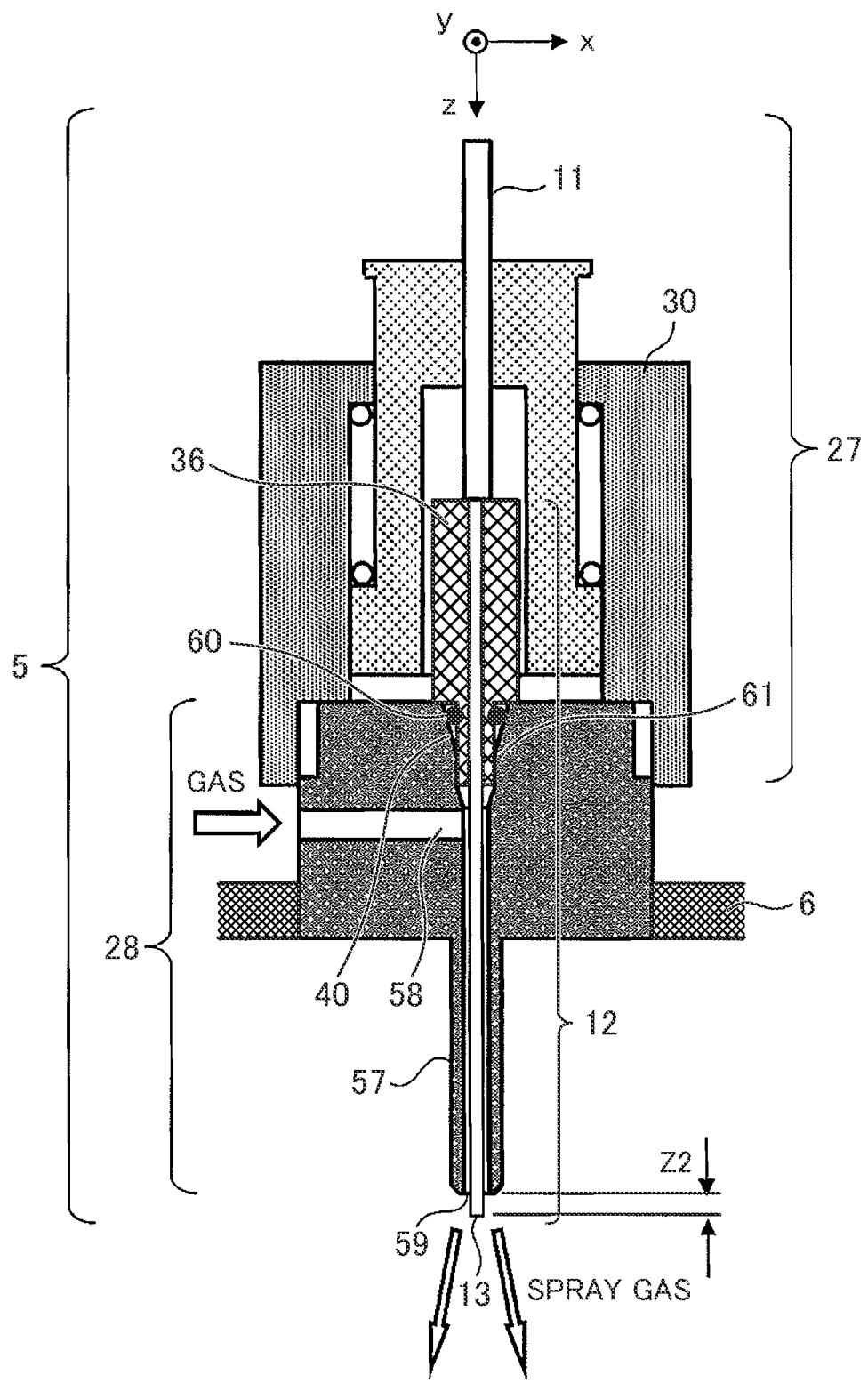
FIG. 16 is a block diagram of an ion producing unit according to an exemplary modification of the sixth embodiment.

FIG. 16 is a block diagram of an exemplary modification of the sixth embodiment. In this example, a fitting part 61 is formed on the inner side of the capillary retaining unit 28, and the outer side of the large-diameter member 36 of the capillary 12 is partially fit into the fitting part 61.

In FIG. 15, the sealing material 60 is disposed at the position of face seal in the large-diameter member 36. However, in FIG. 16, the sealing material 60 is disposed at a position corresponding to a tapered part 40 (one kind of axial sealing). Here, a complete axial sealing configuration may be formed in which the sealing material 60 is disposed at a position corresponding to the fitting part 61. However, when seal is provided at the tapered part 40 as in FIG. 16, the frictional resistance of the sealing material 60 in the insertion and extraction of the capillary 12 is relatively made small, and it is possible to improve maintainability.

In FIG. 15, since the spring force of the compression spring 31 is used for the force of pressing the sealing material 60, the sealing force is lost correspondingly. The loss of the sealing force occurs also in the configuration in FIG. 16. However, since oblique sealing is provided, the loss is smaller than in the configuration in FIG. 15.

In the case of using such an axial sealing method, the sealing material 60 may be disposed on the capillary retaining unit 28, not on the large-diameter member 36. However, in such a configuration, the sealing material 60 is present at the insertion place of the capillary 12, and this is possibly a cause for the capillary 12 to be stuck when it is inserted. Therefore, disposing the sealing material 60 on the capillary 12 is more desirable.

As shown in FIG. 16, the coordinate axis of the capillary 12 in the longitudinal direction (in the axial direction) is defined as a Z-axis, and the coordinate axes of directions orthogonal to the Z-axis and orthogonal to each other are defined as an X-axis and a Y-axis. Particularly, the downward direction of the paper surface of FIG. 16 is a Z-axis positive direction, the front direction of the paper surface is a Y-axis positive direction, and the right direction of the paper surface is an X-axis positive direction. The direction when ions travel from the downstream end 13 of the capillary 12 toward the introduction electrode 7 is roughly a direction along the X-axis.

Since the fitting part 61 is present as in FIG. 16, the position in the X-axis direction and in the Y-axis direction can be regulated, and thus the reproducibility of the mounting position is improved.

Figure 17:
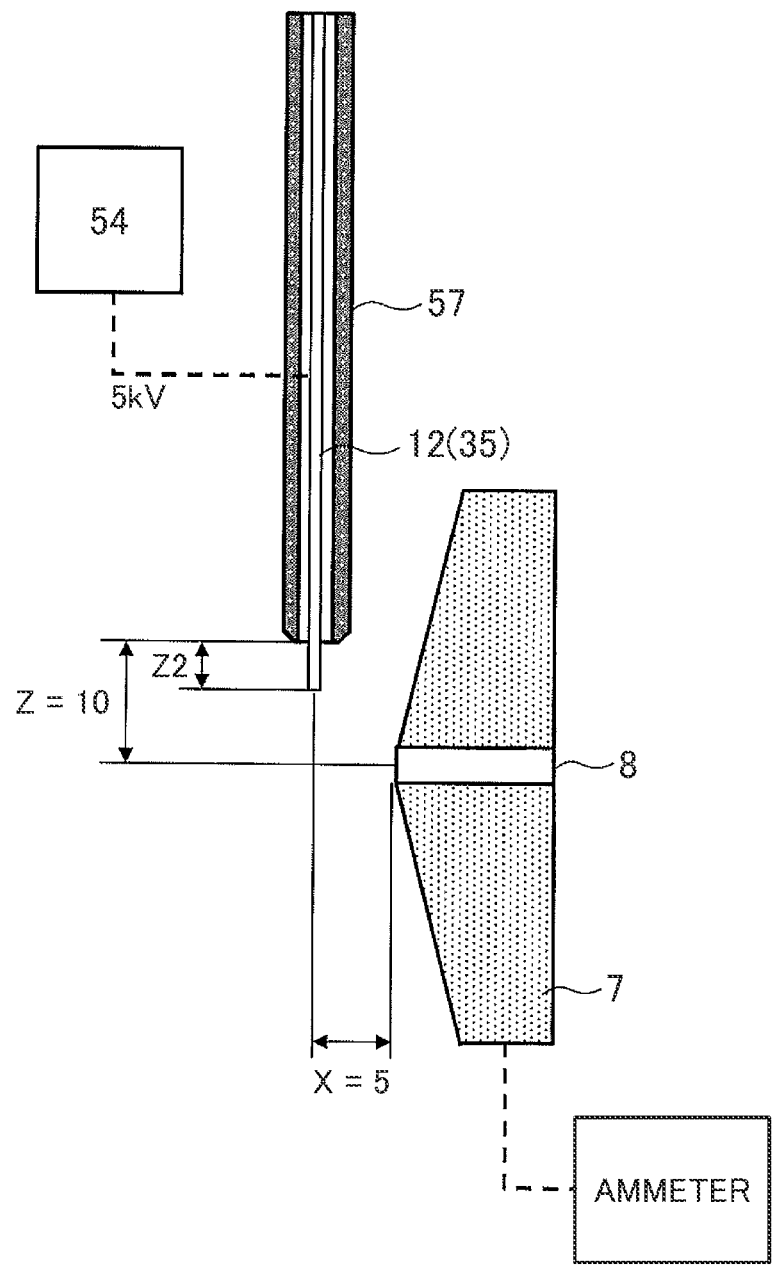
FIG. 17 is an experiment of the ion producing unit according to the sixth embodiment.

Next, the importance of the reproducibility of the projecting amount Z2 of the capillary 12 from the tip end of the gas spray pipe 57 will be described. In the configuration shown in FIG. 17, the experiment of detecting an electric current with the projecting amount Z2 was performed. The coordinates of the center of the hole 8 of the introduction electrode 7 (the inlet position) is defined as the origin point (X, Y, Z)=(0, 0, 0). A Z-axis direction distance Z from the origin point to the tip end of the gas spray pipe 57 is 10 mm, and an X-axis direction distance X from the origin point to the axis of the capillary 12 is 5 mm. Note that a Y-axis direction distance from the origin point to the axis of the capillary 12 was 0 mm (not shown specifically).

Figure 18:
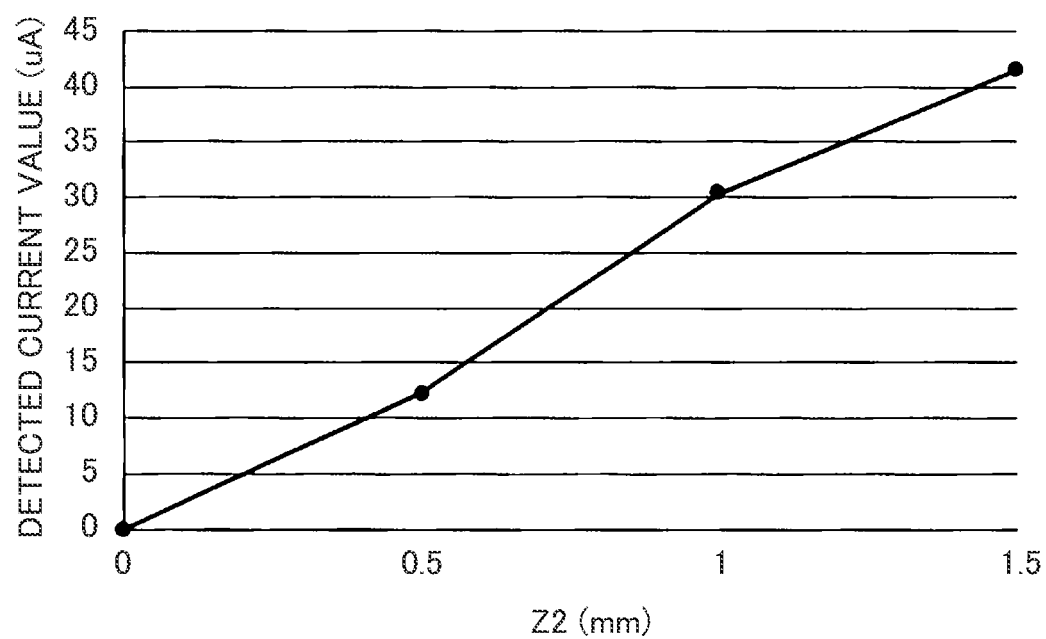
FIG. 18 is an experimental result of the ion producing unit according to the sixth embodiment (current value measurement)

The experiment was performed in a state in which no sample liquid solution was supplied and no gas was sprayed as well. FIG. 18 shows a result in which under these conditions, when a voltage of 5 kV was applied to the gas spray pipe 57 and the capillary 12 with respect to the introduction electrode 7, the value of an electric current carried between the gas spray pipe 57 and the capillary 12 and the introduction electrode 7 was detected using an ammeter.

As the result of FIG. 18, it is shown that the detected value of the electric current differs corresponding to the projecting amount Z2. The value of the electric current relates to the strength of the electric field, i.e., analysis sensitivity. In order to obtain high analysis reproducibility, the necessity of an assembly of high reproducibility of the projecting amount Z2 is shown.

Next, the result of evaluating pressure resistance evaluation in the configuration in FIG. 16 will be described. In regard to the configuration of the pipe 11, the downstream end face 34 was made of a PEEK resin, the contacting part with the capillary 12 was formed in a ring shape, and the outer diameter of this ring shape was 1.6 mm, and the inner diameter thereof was 0.8 mm.

Figure 19:
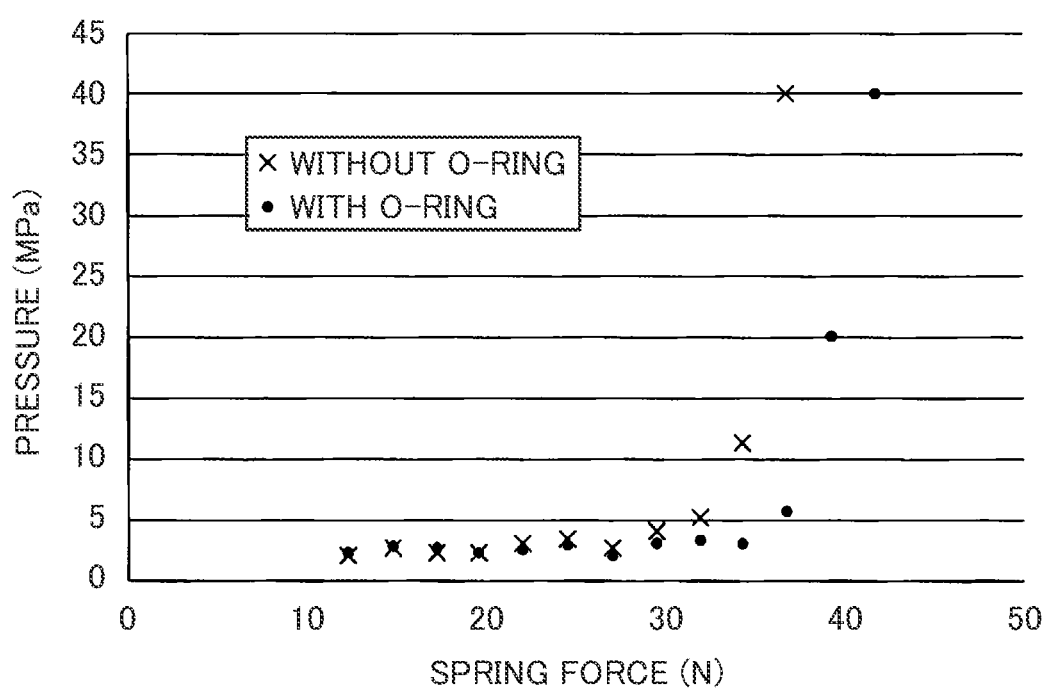
FIG. 19 is an experimental result of the ion producing unit according to the sixth embodiment (pressure measurement)

On the other hand, in regard to the configuration of the capillary 12, the upstream side end face 37 was made of stainless steel, and the inner diameter of the capillary 12 was sealed in order to increase a pressure. FIG. 19 shows the result in which the relationship between the pressure resistance and the load of the compression spring 31 when a liquid solution (water:methanol=1:1) was delivered to the pipe 11 at a flow rate 0.1 mL/min was plotted under these conditions.

In FIG. 19, comparison is based on the presence or absence of the sealing material 60. Compared with the experimental result in a configuration in which the sealing material 60 is present ("WITH O-RING"), in the experimental result in a configuration in which the sealing material 60 is absent ("WITHOUT O-RING"), high pressure resistance was obtained with a small load. From this result, as described above, since the force of pressing the sealing material 60 is necessary, it can be determined that the spring force is lost.

In the present experiment, an O-ring (an inner diameter of 3 mm, and a wire diameter of 1 mm) was used for the sealing material 60, the angle of the tapered part 40 was at an angle of 30 degrees, and the margin for pressing the O-ring was 15% (i.e., the depth of the groove for disposing the O-ring was 85% of the wire diameter of the O-ring). In the case in which face seal as in FIG. 15 is provided with the same margin for pressing, the force of pressing the O-ring is required in the oblique direction to need about four times of the pressing force, for example, and thus the spring force is further lost.

Figure 20:
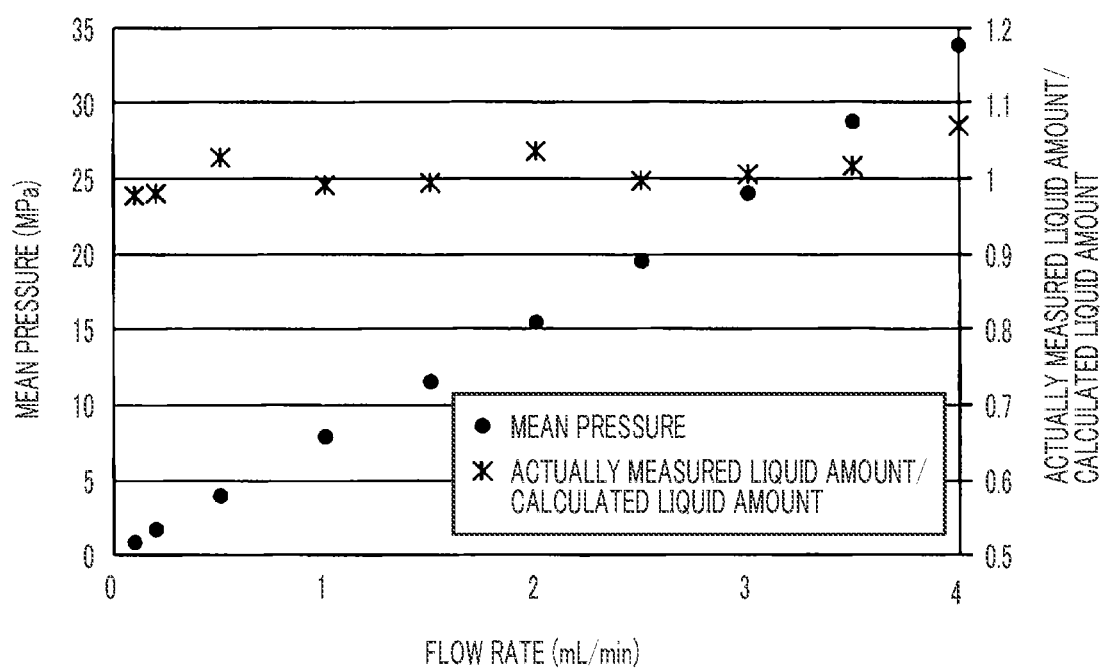
FIG. 20 a block diagram of the experimental result of the ion producing unit according to the sixth embodiment (flow rate dependency)

FIG. 20 shows the result in which in the same experimental configuration as "the O-ring is present" in FIG. 19, wherein the average pressure at the flow rate when a liquid solution (water:methanol=1:1) was actually carried without sealing the inner diameter of the capillary 12 was plotted.

This experiment is performed under the conditions in which the length of the capillary 12 was 168 mm, and the inner diameter was 0.1 mm. The ratio (the actually measured liquid amount/the calculated liquid amount) of the actually measured liquid amount of liquid solution actually flowed out from the downstream end 13 of the capillary 12, recovered and measured, to the theoretical value (the calculated liquid amount) of the liquid solution amount calculated from the set flow rate and solution delivery time was plotted together. As shown in FIG. 20, the linearity between the flow rate and the pressure is excellent. Moreover, in regard to the actually measured value and the theoretical value of the liquid solution amount, the value considerably close to one is maintained, and it was possible to confirm that there is no leakage of the liquid solution or the like.

Seventh Embodiment

A seventh embodiment is an ion source and a mass spectrometer in which a capillary retaining unit is formed in a double structure. For convenience, differences from the first embodiment will be mainly described.

Figure 21:
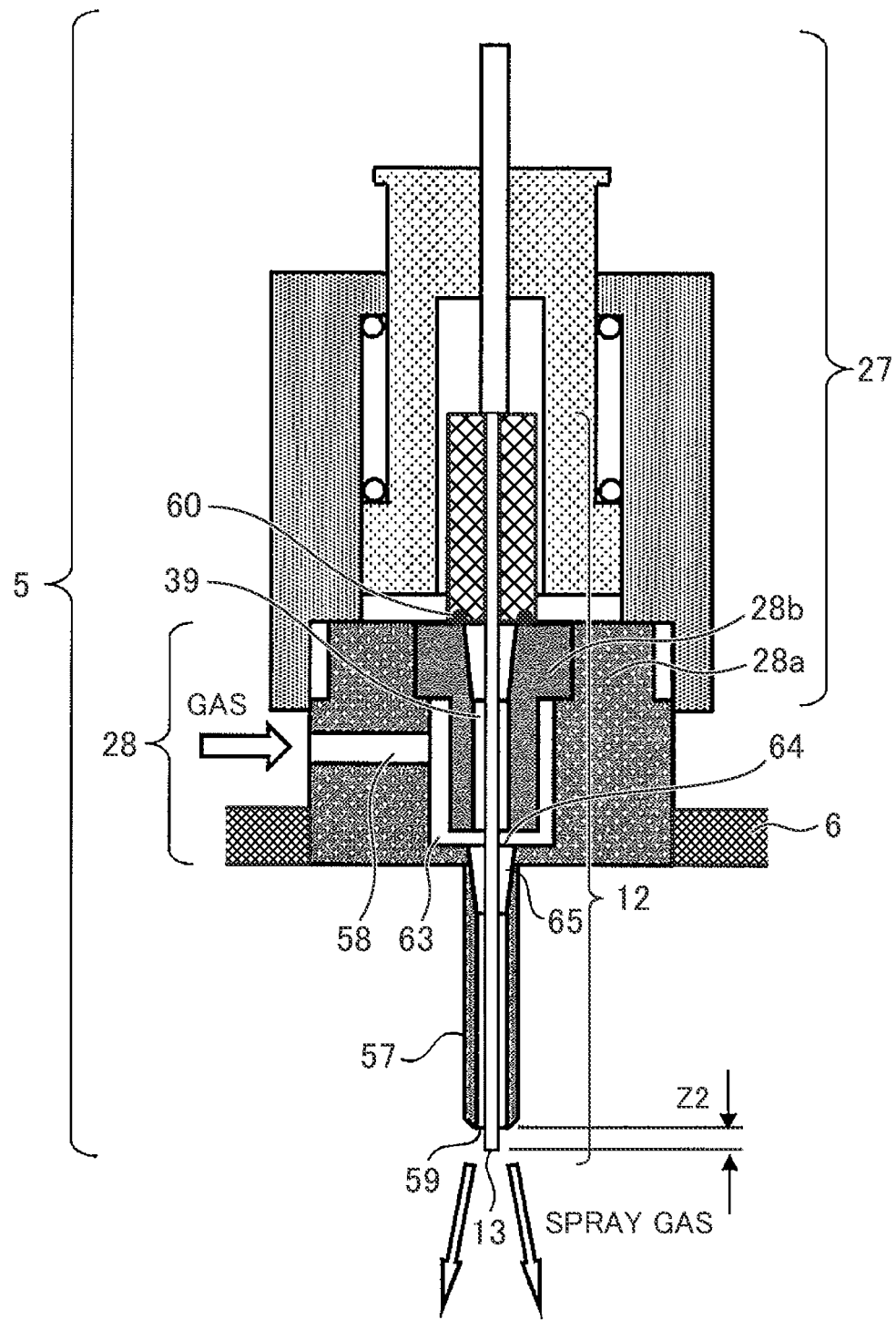
FIG. 21 is a block diagram of an ion producing unit according to a seventh embodiment.

FIG. 21 is a block diagram of an ion producing unit 5 according to the seventh embodiment. In the present embodiment, a capillary retaining unit 28 of an ion producing unit 5 has a feature in which its inside is formed in a double structure. For example, the capillary retaining unit 28 includes an outer-side member 28a and an inner-side member 28b. With the inner-side member 28b, it is possible to achieve a structure in which a gas inlet port 58 is not directly seen from the insertion path of a capillary 12. That is, a hole 39 is partitioned from the gas inlet port 58 with the inner-side member 28b, and the capillary 12 does not contact the gas inlet port 58 or its surrounding area when the capillary 12 is inserted.

Thus, it is possible to prevent the capillary 12 from being stuck on the gas inlet port 58 when the capillary 12 is inserted into the hole 39. In even such a double structure, the gas inlet port 58 communicate with the internal cavity of a gas spray pipe 57 through a space 63 on the outer side of the inner-side member 28b, and thus it is possible to achieve a structure in which a gas is carried.

The space 63 partitions the hole 39 from the inner diameter of the gas spray pipe 57. However, a tapered part 65 having an opening 64 larger than the hole 39 is provided at the upstream side inlet on the inner diameter of the gas spray pipe 57, and thus it is possible to smoothly insert the capillary 12.

In the present embodiment, the configuration in FIG. 21 is described. However, a specific configuration is not limited to FIG. 21 as long as the configuration is provided in which the gas inlet port 58 is not directly seen from the insertion path of the capillary (i.e., when the capillary 12 is inserted, the capillary 12 does not contact the gas inlet port 58 or its surrounding area).

In the configuration of the seventh embodiment as described above, it is possible to achieve an ion source and a mass spectrometer that are capable of smoothly inset a capillary.

Eighth Embodiment

An eighth embodiment is an ion source and a mass spectrometer in which the installation face of a capillary retaining unit is formed of a tapered face. For convenience, differences from the first embodiment will be mainly described.

Figure 22A:
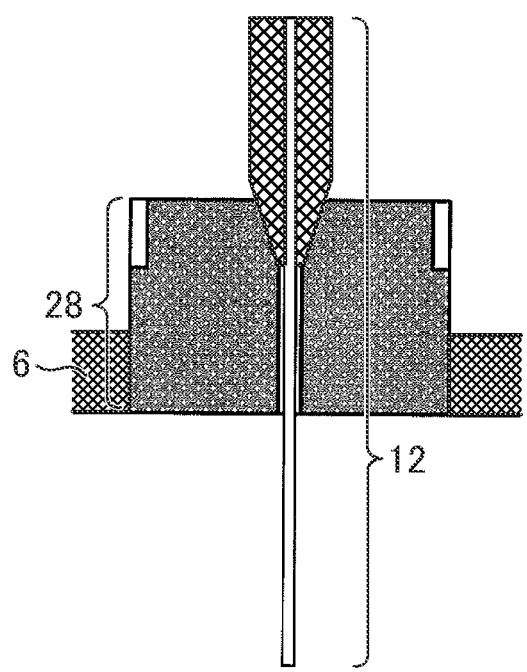
FIGS. 22A-C are block diagrams of an ion producing unit according to an eighth embodiment.
Figure 22B:
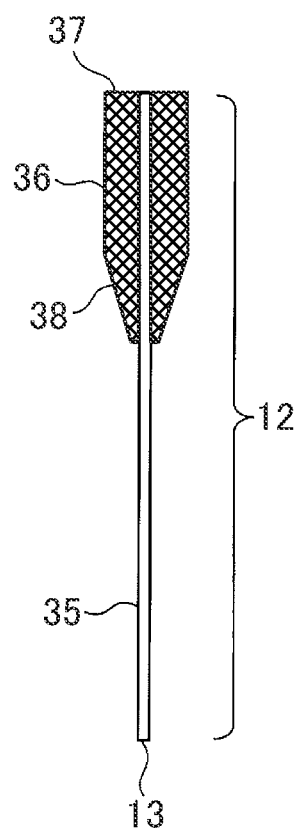
Figure 22C:
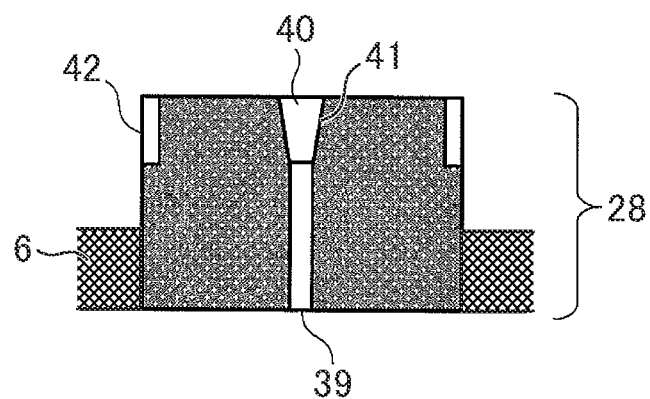

FIGS. 22A-C are block diagrams of an ion producing unit 5 according to the eighth embodiment. FIG. 22A shows a state in which a capillary 12 is set on a capillary retaining unit 28, FIG. 22B shows the configuration of the capillary 12, and FIG. 22C shows the configuration of the capillary retaining unit 28.

As shown in FIG. 22, the ion producing unit 5 of the present embodiment has a feature in which an installation face 41 of the capillary retaining unit 28 is formed of a tapered part 40. Correspondingly, a downstream side face 38 of the capillary 12 is formed in a tapered shape.

As in FIG. 22A, even a set of the tapered faces can regulate the position of the capillary 12 in the Z-axis direction, and thus it is possible to obtain the effect similar to the first embodiment (note that the definition of the coordinate system is similar to that in FIG. 16). Moreover, the fitting of the tapered faces can also regulate the positions in the X-axis direction and in the Y-axis direction (i.e., the axes can be aligned), and as a result, all the positions of the X-axis, Y-axis, and Z-axis can be regulated, and thus it is possible to simplify the shapes of components.

In the configuration of the eighth embodiment as described above, it is possible to achieve an ion source and a mass spectrometer that are capable of simplifying the shapes of components by positioning using a tapered face.

Ninth Embodiment

A ninth embodiment is an ion source and a mass spectrometer having a spring at a capillary retaining unit. For convenience, differences from the first embodiment will be mainly described.

Figure 23:
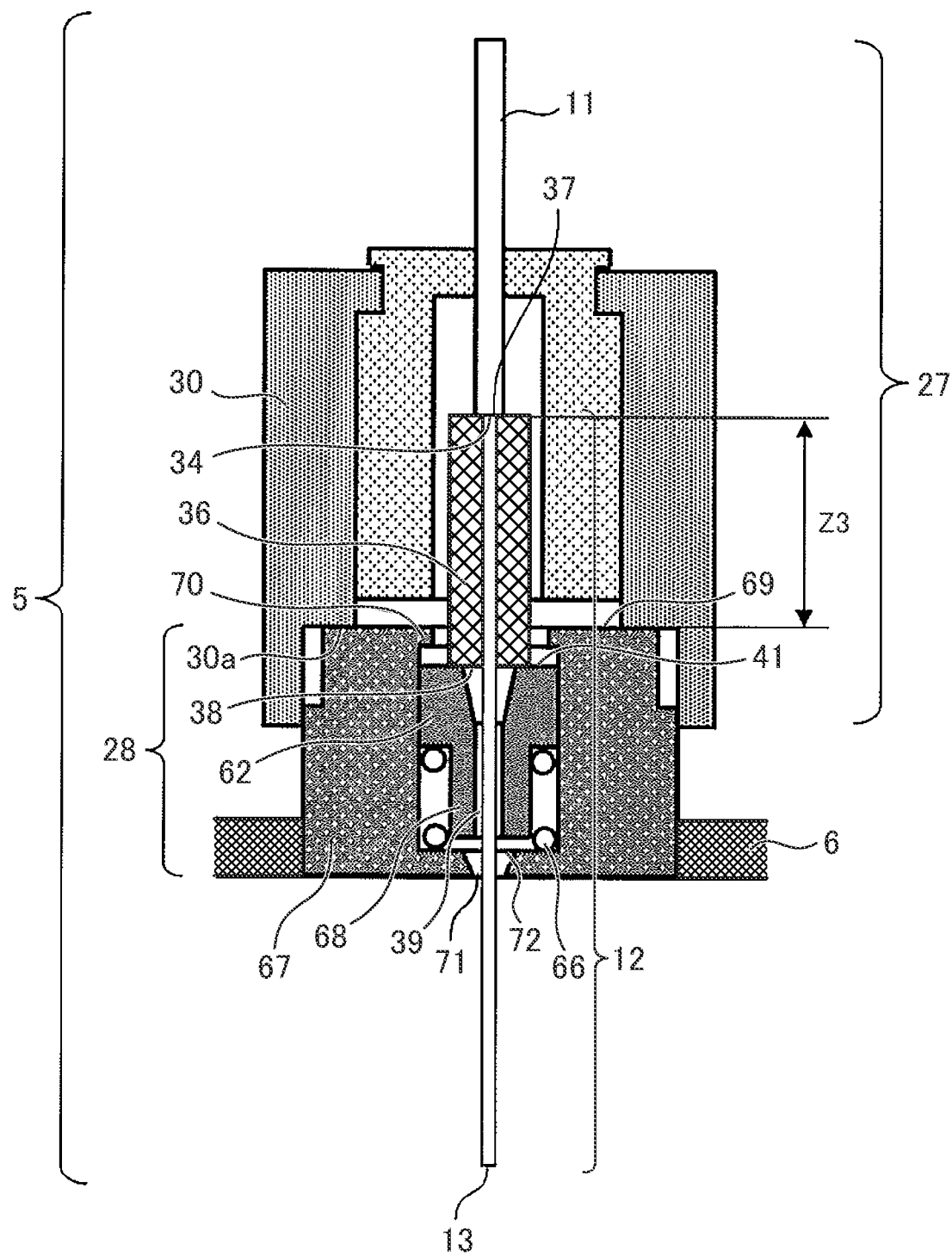
FIG. 23 is a block diagram of an ion producing unit according to a ninth embodiment.

FIG. 23 is a block diagram of an ion producing unit according to the seventh embodiment. In the ion producing unit 5 in FIG. 23, a capillary retaining unit 28 is formed of two members (e.g., including an outer-side member 67 and an inner-side member 68), a feature is provided in which these two members are assembled through a compression spring 66.

The capillary retaining unit 28 in FIG. 23 is configured in a state in which the outer-side member 67 and the inner-side member 68 are placed with the compression spring 66. Thus, similarly to the first embodiment, when a nut part 30 is rotated to assemble a pipe retaining unit 27 with the capillary retaining unit 28, it is possible to apply sealing force across a downstream end face 34 of a pipe 11 and an upstream side end face 37 of a capillary 12 with the action of the compression spring 66.

Since the capillary retaining unit 28 is separated into the outer-side member 67 and the inner-side member 68, in the present embodiment, a face 69 that receives an internal lower end face 30a of the nut part 30 is different from an installation face 41 that receives a downstream side face 38 of a large-diameter member 36 of the capillary 12.

Desirably, a stopper 70 is provided on the outer-side member 67 such that the inner-side member 68 is not ejected on the upstream side due to the spring force of the compression spring 66. For the stopper 70, various mechanisms, such as a snap ring and a pin, can be used instead of the step as in FIG. 23.

As long as a positional relationship Z3 between the internal lower end face 30a of the nut part 30 and the downstream end face 34 of the pipe 11 in the Z-axis direction is stable, the position Z1 (see FIG. 4) of the downstream end 13 of the capillary 12 is also a constant position.

Moreover, the diameter of an upstream side opening 72 of a hole 71 of the outer-side member 67 is made larger than the diameter of a hole 39 of the inner-side member 68, and thus it is possible to smoothly insert the capillary 12.

In the present embodiment, since the capillary retaining unit has a mechanism including the compression spring 66, it is unnecessary to provide such a mechanism on the pipe retaining unit 27, and the weight of the pipe retaining unit 27 is reduced. Therefore, the weight of the part actually attached and detached in the replacement of the capillary 12 is reduced, and maintainability is improved.

In the configuration of the ninth embodiment as described above, the capillary retaining unit 28 has the compression spring 66 to reduce the weight of the pipe retaining unit, and thus it is possible to achieve an ion source and a mass spectrometer that improve maintainability.

As described above, in regard to the device configurations of the forgoing embodiments, it is possible to obtain the effect of the present invention also on device forms that combine the feature elements of the device configurations.

REFERENCE SIGNS LIST

1: mass spectrometer
2: ion source
5: ion producing unit
11: pipe
12: capillary (12a: small-diameter part, 12b: large-diameter part)
13: downstream end (capillary downstream-side end face)
27: pipe retaining unit
28: capillary retaining unit
30: nut part (30a: internal lower end face (positioning face))
31, 66: compression spring (elasticity member)
33: female screw part (direct-acting mechanism, screwing mechanism)
37: upstream side end face (capillary upstream-side end face)
41: installation face (positioning face)
42: male screw part (direct-acting mechanism, screwing mechanism)
44, 48: resin layer
50: rotation prevention pin (rotation prevention mechanism)
53: contact pin (unit that makes electric potentials equal)
57: gas spray pipe All references, including publications, patents, and patent applications, cited herein are incorporated herein by reference.

What is claimed is:

1. An ion source comprising:
    a capillary into which a sample liquid solution is introduced, the capillary being configured to supply an ion or a droplet; and
    a pipe configured to supply a sample liquid solution to the capillary, wherein:
    the capillary has a capillary upstream-side end face on an upstream side, and has a capillary downstream-side end face on a downstream side, and an outer diameter of the capillary upstream-side end face is greater than an outer diameter of the capillary downstream-side end face;
    the capillary has a large-diameter part that forms the capillary upstream-side end face on the upstream side, and the large-diameter part has a large-diameter part downstream side face on the downstream side;
    the pipe has a pipe downstream end face on the downstream side;
    the ion source includes a capillary retaining unit configured to retain the capillary, the capillary retaining unit having an upstream end and a downstream end;
    the capillary retaining unit has a hole proximate to the upstream end of the capillary retaining unit through which the capillary downstream-side end face is passable and has a face on which the large-diameter part downstream side face is installable;
    the ion source includes a pipe retaining unit configured to retain the pipe; and
    the capillary retaining unit and the pipe retaining unit are disposed such that the capillary upstream-side end face contacts the pipe downstream end face to connect the capillary to the pipe,
    wherein the capillary retaining unit hole comprises a tapered part, the tapered part having a wider diameter at the upstream end of the capillary retaining unit and tapering to a narrower diameter downstream of the upstream end of the capillary retaining unit.

2. The ion source according to claim 1,
    wherein the capillary retaining unit is coupled to the pipe retaining unit through a direct-acting mechanism.

3. The ion source according to claim 2,
    wherein the direct-acting mechanism is a screwing mechanism.

4. The ion source according to claim 1,
    wherein the capillary retaining unit or the pipe retaining unit includes an elastic member.

5. The ion source according to claim 4,
    wherein the elastic member is a spring.

6. The ion source according to claim 4,
    wherein a positioning face of the capillary retaining unit is joined to a positioning face the pipe retaining unit, thereby the capillary retaining unit and the pipe retaining unit are positioned to each other and fixed.

7. The ion source according to claim 1,
    wherein at least one of the capillary upstream-side end face or the pipe downstream end face has a resin layer.

8. The ion source according to claim 1,
    wherein a rotation prevention mechanism configured to prevent relative rotation between the pipe and the capillary is included.

9. The ion source according to claim 1, wherein:
the pipe retaining unit and the capillary retaining unit both have a conductive member; and
the ion source includes a unit configured to make an electric potential of the conductive member of the pipe retaining unit and an electric potential of the conductive member of the capillary retaining unit equal.

10. The ion source according to claim 1,
wherein the capillary retaining unit has a gas spray pipe.

11. A mass spectrometer comprising the ion source according to claim 1.

* * * * *